United States Patent
Tseng et al.

(10) Patent No.: US 12,532,343 B2
(45) Date of Patent: Jan. 20, 2026

(54) METHOD OF PERFORMING SMALL DATA TRANSMISSION IN RADIO RESOURCE CONTROL INACTIVE STATE AND RELATED DEVICE

(71) Applicant: SHARP KABUSHIKI KAISHA, Sakai (JP)

(72) Inventors: Yung-Lan Tseng, Taipei (TW); Hsin-Hsi Tsai, Taipei (TW); Mei-Ju Shih, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 448 days.

(21) Appl. No.: 18/038,554

(22) PCT Filed: Nov. 24, 2021

(86) PCT No.: PCT/CN2021/132894
§ 371 (c)(1),
(2) Date: May 24, 2023

(87) PCT Pub. No.: WO2022/111542
PCT Pub. Date: Jun. 2, 2022

(65) Prior Publication Data
US 2024/0040626 A1 Feb. 1, 2024

Related U.S. Application Data

(60) Provisional application No. 63/117,956, filed on Nov. 24, 2020.

(51) Int. Cl.
*H04W 72/542* (2023.01)
*H04W 72/1268* (2023.01)
(Continued)

(52) U.S. Cl.
CPC ..... *H04W 72/542* (2023.01); *H04W 72/1268* (2013.01); *H04W 72/231* (2023.01);
(Continued)

(58) Field of Classification Search
CPC ........... H04W 72/1268; H04W 72/231; H04W 72/542; H04W 74/0833; H04W 74/0836;
(Continued)

(56) References Cited

U.S. PATENT DOCUMENTS

2016/0249155 A1   8/2016  Anev et al.
2018/0092157 A1   3/2018  Chen
(Continued)

FOREIGN PATENT DOCUMENTS

CN          107889274 A      4/2018

OTHER PUBLICATIONS

InterDigital, "RACH-based UL small data transmission procedure", R2-2010106, 3GPP RAN WG2 Meeting #112-e, Nov. 2-12, 2020.
(Continued)

*Primary Examiner* — Kiet Tang
(74) *Attorney, Agent, or Firm* — ScienBiziP, P.C.

(57) ABSTRACT

A method for a user equipment for performing a small data transmission (SDT) procedure is provided. The method includes receiving, from a base station, an SDT configuration including a plurality of uplink configured grant (UL-CG) configurations for the SDT procedure, each of the plurality of UL-CG configurations being associated with a downlink reference signal received power (DL-RSRP) threshold; applying one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and initiating, during the SDT procedure, a
(Continued)

random access (RA) procedure in a case that none of a plurality of DL-RSRP measurement results of a plurality of SSBs associated with the plurality of UL-CG configurations is higher than any of the plurality of DL-RSRP thresholds.

17 Claims, 7 Drawing Sheets

(51) Int. Cl.
　　　H04W 72/231　　(2023.01)
　　　H04W 74/0833　(2024.01)
　　　H04W 74/0836　(2024.01)
　　　H04W 74/0838　(2024.01)
(52) U.S. Cl.
　　　CPC .... *H04W 74/0833* (2013.01); *H04W 74/0836* (2024.01); *H04W 74/0838* (2024.01)
(58) Field of Classification Search
　　　CPC . H04W 74/0838; H04W 72/23; H04W 24/02; H04W 36/0061; H04W 74/0808
　　　See application file for complete search history.

(56) References Cited

U.S. PATENT DOCUMENTS

| | | |
|---|---|---|
| 2019/0132066 A1 | 5/2019 | Park et al. |
| 2020/0214073 A1 | 7/2020 | Shimoda et al. |
| 2020/0396654 A1* | 12/2020 | Freda ................ H04W 36/0061 |
| 2022/0124520 A1* | 4/2022 | Lin ....................... H04W 24/02 |
| 2023/0102946 A1* | 3/2023 | Wang ............... H04W 74/0808 370/329 |

OTHER PUBLICATIONS

Huawei et al: "RA and CG based small data transmission", 3GPP Draft; R1-2101267, 3GPP TSG RAN WG 1 Meeting #104-e, E-meeting, Jan. 25-Feb. 5, 2021 (Jan. 19, 2021).

Qualcomm Incorporated: "Report of [Post114-e][508][SData] Open issues for CG-SDT", 3GPP Draft; R2-2107930, 3GPP TSG-RAN WG2 Meeting #115 electronic, Online, Aug. 16-27, 2021 (Aug. 6, 2021).

\* cited by examiner

METHOD OF PERFORMING SMALL DATA TRANSMISSION IN RADIO RESOURCE CONTROL INACTIVE STATE AND RELATED DEVICE

CROSS-REFERENCE TO RELATED APPLICATION(S)

The present disclosure is a National Stage Application of International Patent Application Serial No. PCT/CN2021/132894, filed on Nov. 24, 2021, which claims the benefit of and priority to U.S. Provisional Patent Application Ser. No. 63/117,956, filed on Nov. 24, 2020, the contents of all which are hereby incorporated herein fully by reference into the present disclosure.

FIELD

The present disclosure is generally related to wireless communications and, more specifically, to a method of performing a small data transmission (SDT) procedure in a radio resource control (RRC) inactive state and a related device.

BACKGROUND

With the tremendous growth in the number of connected devices and the rapid increase in user/network traffic volume, various efforts have been made to improve different aspects of wireless communication for the next-generation wireless communication system, such as fifth-generation (5G) New Radio (NR), by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of performing a small data transmission (SDT) procedure for a user equipment (UE) in a radio resource control (RRC) inactive state and a related device.

According to an aspect of the present disclosure, a method of performing a SDT procedure for a UE in a RRC inactive state is provided. The method includes receiving, from a first serving cell, a SDT configuration, the SDT configuration including a plurality of uplink Configured Grant (UL-CG) configurations for the SDT procedure, wherein each UL-CG configuration is associated with a first downlink Reference Signal Received Power (DL-RSRP) threshold, selecting, by the UE, a first UL-CG configuration from the plurality of UL-CG configurations when the UE initiates a SDT procedure, and applying the first UL-CG configuration for the SDT procedure when a downlink Reference Signal Received Power (DL-RSRP) measurement result associated with the first UL-CG configuration and measured by the UE, is higher than the first DL-RSRP threshold, wherein the SDT procedure initiated by applying the first UL-CG configuration is a SDT Configured Grant (CG) procedure.

According to another aspect of the present disclosure, a UE for performing a SDT procedure in a RRC inactive state is provided. The UE includes a processor configured to execute a computer-executable program, and a memory coupled to the processor and configured to store the computer-executable program, wherein the computer-executable program instructs the processor to perform the above-described method of performing a SDT procedure in the RRC inactive state.

In another aspect of the present disclosure, a method for a user equipment for performing a small data transmission (SDT) procedure is provided. The method includes receiving, from a base station, an SDT configuration including a plurality of uplink configured grant (UL-CG) configurations for the SDT procedure, each of the plurality of UL-CG configurations being associated with a downlink reference signal received power (DL-RSRP) threshold; applying one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and initiating, during the SDT procedure, a random access (RA) procedure in a case that none of a plurality of DL-RSRP measurement results of a plurality of SSBs associated with the plurality of UL-CG configurations is higher than any of the plurality of DL-RSRP thresholds. The SDT procedure includes a configured grant (CG) SDT procedure.

In an implementation of another aspect of the present disclosure, the method further includes determining the RA procedure is successfully completed after receiving a random access response (RAR) comprising a UL grant on a physical downlink control channel (PDCCH).

In an implementation of another aspect of the present disclosure, configured grant-time alignment timer (CG-TAT) is running during the SDT procedure.

In an implementation of another aspect of the present disclosure, the RA procedure includes a 2-step RA procedure.

In an implementation of another aspect of the present disclosure, the RA procedure includes a 4-step RA procedure.

In an implementation of another aspect of the present disclosure, the RA procedure includes a contention-based random access (CBRA) procedure.

In an implementation of another aspect of the present disclosure, the RA procedure includes a contention-free random access (CFRA) procedure.

In an implementation of another aspect of the present disclosure, the RA procedure is not an RA-SDT procedure.

In another aspect of the present disclosure, a user equipment (UE) for performing a small data transmission (SDT) procedure is provided. The UE includes one or more processors; and at least one memory coupled to the one or more processors, wherein the at least one memory stores one or more computer-executable instructions that, when executed by the one or more processors, cause the UE to: receive, from a base station (BS), an SDT configuration including a plurality of uplink configured grant (UL-CG) configurations for the SDT procedure, each of the plurality of UL-CG configurations being associated with a downlink reference signal received power (DL-RSRP) threshold; apply one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and initiate, during the SDT procedure, a random access (RA) procedure in a case that none of a plurality of DL-RSRP measurement results of a plurality of SSBs associated with the plurality of UL-CG configurations is higher than any of the plurality of DL-RSRP thresholds. The SDT procedure includes a configured grant (CG) SDT procedure.

In another aspect of the present disclosure, a base station (BS) for performing a small data transmission (SDT) procedure is provided. The BS includes one or more processors; and at least one memory coupled to the one or more processors, wherein the at least one memory stores one or more computer-executable instructions that, when executed by the one or more processors, cause the BS to: transmit, to a user equipment (UE), an SDT configuration including a plurality of uplink configured grant (UL-CG) configurations for the SDT procedure, each of the plurality of UL-CG configurations being associated with a downlink reference signal received power (DL-RSRP) threshold; receive, from the UE, one or more UL transmissions on one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and transmit, to the UE during the SDT procedure, a random access response in response to a random access (RA) procedure in a case that none of a plurality of DL-RSRP measurement results of a plurality of SSBs associated with the plurality of UL-CG configurations is higher than any of the plurality of DL-RSRP thresholds. The SDT procedure includes a configured grant (CG) SDT procedure.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
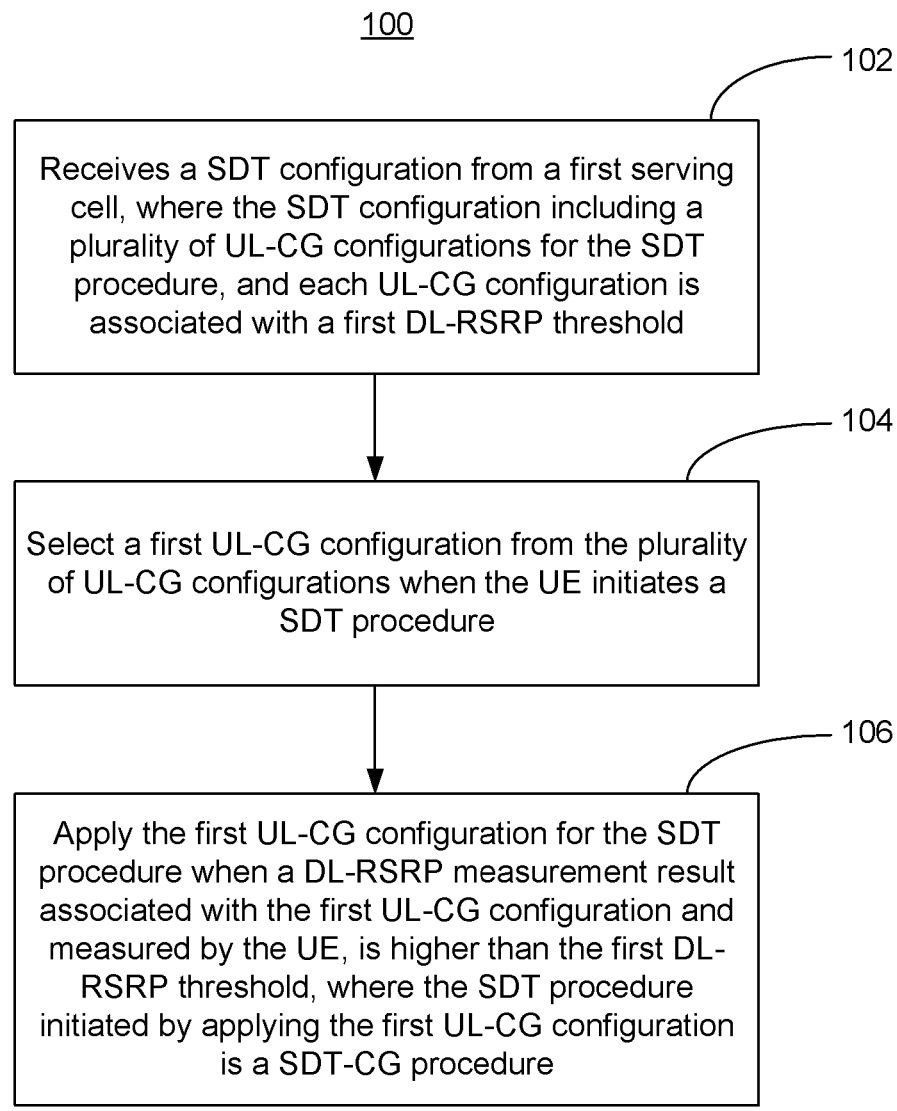
FIG. 1 is a flowchart illustrating a method for performing a small data transmission (SDT) procedure in a radio resource control (RRC) inactive state, according to an example implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more B Ss.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

FIG. 1 is a flowchart illustrating a method 100 for performing a small data transmission (SDT) procedure for a UE in a radio resource control (RRC) inactive state, according to an example implementation of the present disclosure. In action 102, the UE receives an SDT configuration from a first serving cell, where the SDT configuration includes a plurality of uplink Configured Grant (UL-CG) configurations for the SDT procedure, and each UL-CG configuration is associated with a first downlink Reference Signal Received Power (DL-RSRP) threshold. In action 104, the UE selects a first UL-CG configuration from the plurality of UL-CG configurations when the UE initiates an SDT procedure. In action 106, the UE applies the first UL-CG configuration for the SDT procedure when a downlink Reference Signal Received Power (DL-RSRP) measurement result associated with the first UL-CG configuration and measured by the UE, is higher than (or equal to/not smaller than) the first DL-RSRP threshold, where the SDT procedure initiated by applying the first UL-CG configuration is an SDT Configured Grant (CG) procedure.

In some examples, the UE stops applying the first UL-CG configuration for the SDT procedure when the DL-RSRP measurement result associated with the first UL-CG configuration is lower than (or equal to) the first DL-RSRP threshold.

In some examples, the UE re-selects the first UL-CG configuration for a UL packet transmission of the SDT procedure when the DL-RSRP measurement result associated with the first UL-CG configuration is larger than the first DL-RSRP threshold.

In some examples, the UE determines a DL-RSRP measurement result associated with the first UL-CG configuration according to at least one downlink (DL) Synchronization Signal Block (SSB) associated with the first UL-CG configuration, where associations between the SSBs and the plurality of UL-CG configurations are configured in the SDT configuration.

In some examples, the UE performs a random access (RA) procedure for a UL packet transmission of the SDT procedure with the first serving cell when a plurality of DL-RSRP measurement results associated with the plurality of UL-CG configurations is lower than a second DL-RSRP threshold.

In some examples, the RA procedure is initiated for an RRC Resume procedure with the first serving cell, an on-demand system information (SI) request procedure or a RAN Notification Area Update (RNAU) procedure.

In some examples, the RA procedure is initiated for an SDT-RA procedure (also known as an RA-SDT procedure in the 3GPP technical documents) with the first serving cell when the UE stays in the RRC inactive state.

In some examples, the UE stops the SDT-CG procedure (also known as a CG-SDT procedure in the 3GPP technical documents) when the UE moves from the first serving cell to a second serving cell after a first cell reselection procedure is performed, and the UE stores the plurality of UL-CG configurations for the SDT procedure when the UE camps on the second serving cell.

In some examples, the UE releases the plurality of UL-CG configurations for the SDT procedure when the UE initiates an RRC Resume procedure with the second serving cell (e.g., when the UE transmits a preamble via an MSGA of a 2-step RA procedure or via an MSG1 of a 4-step RA procedure, or when the UE transmits an RRCResumeRequest message via an MSGA of a 2-step RA procedure or via an MSG3 of a 4-step RA procedure). In some implementations, the UE releases the plurality of UL-CG configurations for the SDT procedure when the UE receives a Response message (e.g., a RAR message, an RRC message, or an Automatic Repeat reQuest (ARQ)/Hybrid Automatic Repeat reQuest (HARQ)/Layer-1 Acknowledgement (ACK)/Layer-1 Negative Acknowledgement (NACK) message) from the second serving cell during the RRC Resume procedure.

In some implementations, the UE may release the plurality of UL-CG configurations for the SDT procedure when the UE initiates an SI on-demand procedure with the second serving cell (e.g., when the UE transmits a preamble via an MSGA of a 2-step RA procedure or via an MSG1 of a 4-step RA procedure, or when the UE transmits an RRCSysteminfoRequest message via an MSGA of a 2-step RA procedure or via an MSG3 of a 4-step RA procedure). In some implementations, the UE may release the plurality of UL-CG configurations for the SDT procedure when the UE receives a Response message (e.g., an ACK message for the transmitted RRCSystemInfoRequest message) from the second serving cell during the SI on-demand procedure. However, in some additional implementations, the UE may not release the plurality of UL-CG configurations for the SDT procedure when the UE initiates an SI on-demand procedure with the second serving cell. It should be noted that, in some implementations, the RRCSystemInfoRequest message may be generated with an rrcPosSystemInfoRequest for positioning. In some other implementations, the RRCResumeRequest message may be generated without attaching the rrcPosSystemInfoRequest.

In some implementations, the UE may release the plurality of UL-CG configurations for the SDT procedure when the UE initiates an RNAU procedure with the second serving cell (e.g., when the UE transmits a preamble via an MSGA of a 2-step RA procedure or via an MSG1 of a 4-step RA procedure, or when the UE transmits an RRCResumeRequest message with resumecause='RAN Notification Area Update' via an MSGA of a 2-step RA procedure or via an MSG3 of a 4-step RA procedure). In some implementations, the UE may release the plurality of UL-CG configurations for the SDT procedure when the UE receives a Response message (e.g., an RRC message or an ARQ/HARQ/Layer-1 ACK/NACK message) from the second serving cell during the RNAU procedure. However, in some other implementations, the UE may not release the plurality of UL-CG configurations for the SDT procedure when the UE initiates an RNAU procedure with the second serving cell.

In some examples, the UE accesses the plurality of UL-CG configurations (e.g., associated with the first serving cell) when the UE initiates another SDT procedure with the first serving cell after the UE moves from the second serving cell to the first serving cell via a second cell reselection procedure and/or when the UE re-obtains the uplink timing advance with the first serving cell again.

The previously mentioned SDT procedure enables a UE to get out of the NR/LTE RRC connected state (e.g., (LTE/NR) RRC inactive state, (LTE/NR) RRC idle state) to transmit small data (e.g., the encoded packet having the packet size that may be lower than an upper bound) when the UE stays out of the RRC connected state (e.g., the UE may stay in the RRC inactive state or an RRC idle state). For an SDT procedure, a serving cell may pre-configure an SDT configuration to the UE. For example, the serving cell may transmit SDT configuration(s) via a DL UE-specific control signaling (e.g., RRC(Connection)Release message) that instructs the UE to move to the RRC inactive state (e.g., the RRCRelease message includes 'suspendConfig' IE). In some implementations, the SDT configuration may be included as part of the 'suspendConfig' IE. In some other implementations, the SDT configuration may be configured out of the 'suspendConfig' IE. Therefore, the UE may access the SDT configuration after the UE moves to the RRC inactive state.

Two types of radio resources for the SDT configuration include:

1. SDT-CG configuration: (Type 1/Type 2) uplink configured grant (UL-CG configuration (e.g., the locations of physical radio resources on a time domain/frequency domain and a periodicity of the UL-CG) may be configured in the SDT configuration. The UL-CG configuration includes periodic UL radio resources for the UE may be accessed directly when the UE stays out of the RRC connected state (e.g., when the UE is in (LTE/NR) RRC_INACTIVE state or in (LTE/NR) RRC_IDLE state). Moreover, one or more UL-CG configurations, where each UL-CG configuration may be associated with one unique SDT-CG index in the SDT configuration, may be configured to the UE in the SDT configuration. In this disclosure, the SDT procedure by which the UE transmits small data via a UL-CG configuration is called the SDT-CG procedure.

In SDT-CG configuration(s), the UE may be configured with a Radio Network Temporary Identifier (RNTI), such as a Cell Radio Network Temporary Identifier (C-RNTI) or a Configured Scheduling Radio Network Temporary Identifier (CS-RNTI), for (re-)transmission, a periodicity of the configured grant Type 1, a timing offset of a resource associated with a System Frame Number (SFN), an allocation of configured uplink grant in time domain, a number of HARQ processes for configured grant(s), and an SFN used for determination of an offset of a resource in time domain.

2. SDT-RA configuration: the serving cell may configure a random access (RA) resource configuration (e.g., one or more preamble(s), physical resources for a preamble (e.g., MSG1) transmission and/or physical resources for an MSGA transmission (e.g., including MSGA preamble and/or MSGA PUSCH)) for the UE to perform the SDT procedure via a 2-step/4-step RA procedure. Moreover, one or more RA resource configurations, where each RA resource configuration may be associated with one unique SDT-RA index in the SDT configuration, may be configured to the UE in the SDT configuration. In this disclosure, the SDT procedure by which the UE transmits small data via an RA resource configuration is called the SDT-RA procedure.

In some implementations, a UE-specific Bandwidth Part (BWP) (e.g., one or more UE specific DL-BWP(s)/UL-BWP(s)) may be configured in the SDT configuration. For example, the SDT-CG configuration and/or the SDT-RA configuration may be configured on one (or more) UE-specific UL-BWP(s), respectively. In some implementations, a UE specific DL-BWP may be configured along with the corresponding UL-BWP. Moreover, the UE may be configured with a UE-specific DL-BWP/UL-BWP (the DL-BWP and the UL-BWP may or may not be paired in the SDT configuration), rather than an initial DL-BWP/UL-BWP when the UE stays in the RRC inactive state. In some implementations, the UE may be configured with one initial DL-BWP paired with one UE-specific UL-BWP for the SDT procedure. In some implementations, the UE may be configured with one UE-specific DL-BWP paired with one initial UL-BWP for the SDT procedure. The previously mentioned BWP configuration for the SDT procedure may be configured to the UE via an SDT configuration or via a broadcasting system information (e.g., the configuration for initial DL-BWP/UL-BWP). It should be noted that, in some implementations, the UE may be triggered to perform a BWP-switching during the SDT procedure. In this disclosure, some mechanisms for the UE to switch the BWP before/during/after the SDT procedure are disclosed. In some implementations, one or more UE-specific DL-BWP(s)/UL-BWP(s) may be associated with the SDT-CG configuration and the SDT-CG procedure. In some implementations, one or more UE-specific DL-BWP(s)/UL-BWP(s) may be associated with the SDT-RA configuration and the SDT-RA procedure. The UE may switch between different DL-BWP(s)/UL-BWP(s) when the UE (re)selects a resource and stays in the RRC inactive state. For example, the UE may access the SDT-CG resources (e.g., SDT-CG configurations) for the SDT-CG procedure first and then the UE fallbacks to access the SDT-RA resources (e.g., SDT-RA configuration) for the SDT-RA procedure.

It should be noted that the UE in the RRC inactive state may stay in the initial DL-BWP/initial UL-BWP of an anchor cell when the UE does not trigger/initiate the SDT procedure when the UE stays in the RRC inactive state. On the other hand, when the UE triggers/initiates the SDT procedure, the UE may switch its serving BWP from the initial DL-BWP/initial UL-BWP to the UE-specific DL-BWP/UL-BWP that is configured in the SDT configuration for the SDT procedure. In some implementations, the UE may (or may not) switch from the UE-specific DL-BWP/UL-BWP to the initial DL-BWP/UL-BWP after the SDT procedure is finished.

In some implementations, the UE may switch the UL-BWP only for the SDT procedure. In other words, the UE may stay on the initial DL-BWP/UL-BWP before/during/after the SDT procedure (e.g., when the UL-CG configurations and RA resource configuration for SDT are configured on the initial UL-BWP).

In some implementations, the UE may keep only one active DL-BWP/UL-BWP during the SDT procedure. In some implementations, the UE may stop/release an ongoing SDT procedure (e.g., the SDT-RA procedure or the SDT-CG procedure) when the UE switches the operating DL-BWP/UL-BWP. Then, the UE may start a new SDT procedure after the operating DL-BWP/UL-BWP is switched.

In some implementations, the serving cell may instruct the UE not to use the initial BWP for the SDT procedure. On the other hand, the serving cell may instruct the UE to use a default DL-BWP/UL-BWP or a first active DL-BWP/UL-BWP for the SDT procedure. In some implementations, the previously mentioned instruction may be explicitly indicated in the SDT configuration. In some implementations, the previously mentioned instruction may be implicitly indicated (e.g., the UE switches to the default DL-BWP/UL-BWP automatically after the UE moves to the RRC inactive state with the SDT configuration).

In some implementations, an RNTI (e.g., SDT-RNTI) may be configured in the SDT configuration. In addition, one or more search spaces (e.g., along with specific CORESETs) may also be configured to the UE to monitor the downlink control signaling (DCI) by using the SDT-RNTI (and/or C-RNTI or other additional RNTI configured by the serving cell) for Physical Downlink Control Channel (PDCCH) decoding. In some implementations, the UE may apply the SDT-RNTI, rather than the C-RNTI, to decode the target small packet delivered through the configured SDT-configuration.

In some implementations, both RRC-based and RRC-less mechanisms may be configured to the UE for the SDT procedure. In some implementations, the network (NW) (or a serving cell) may broadcast an indication (e.g., in the system information) or provide an indication (e.g., in dedicated RRC signaling) to indicate if an RRC-based mechanism is adopted for the SDT procedure. In some implementations, the NW (or a serving cell) may broadcast an indication (e.g., in the system information) or provide an indication (e.g., in dedicated RRC signaling) to indicate if an RRC-based mechanism is adopted for the SDT-CG procedure. In some implementations, the NW (or a serving cell, serving base station) may broadcast an indication (e.g., in the system information) or provide an indication (e.g., in dedicated RRC signaling) to indicate if an RRC-based mechanism is adopted for the SDT-RA procedure. In some implementations, the NW (or a serving cell) may broadcast an indication (e.g., in the system information) or provide an indication (e.g., in a dedicated RRC signal) to indicate if an RRC-less mechanism is adopted for the SDT procedure. In some implementations, the NW (or a serving cell) may broadcast an indication (e.g., in the system information) or provide an indication (e.g., in dedicated RRC signaling) to indicate if an RRC-less mechanism is adopted for the SDT-CG procedure. In some implementations, the NW (or a serving cell) may broadcast an indication (e.g., in the system information) or provide an indication (e.g., in dedicated RRC signaling) to indicate if an RRC-less mechanism is adopted for the SDT-RA.

In some implementations, a UE that is capable of performing the SDT procedure in non-RRC_CONNECTED state may apply an RRC-less mechanism for the SDT-CG procedure and apply an RRC-based mechanism for the SDT-RA procedure. In the RRC-based SDT procedure, an RRC signal (e.g., an RRCResumeRequest message that may include the I-RNTI and/or ResumeMAC-I (e.g., Message Authentication Code-Integrity) of the UE) may be encoded, cyphered, and/or multiplexed with the target small packet. Then, the UE transmits the multiplexed packet to the serving cell based on the stored SDT configuration (e.g., SDT-RA configuration or SDT-CG configuration). By contrast, in the RRC-less SDT procedure, no RRC signal is multiplexed with the target small packet. Instead, a UE identity (ID) (or additional control information, such as Medium Access Control (MAC) Control Element (CE)) (e.g., an Inactive RNTI (I-RNTI), a full I-RNTI, a short I-RNTI, and/or a UE-specific RNTI) may be transmitted jointly with the target small packet. It should be noted that the UE may apply the RRC-based mechanism or RRC-less mechanism during the SDT-RA procedure or the SDT-CG procedure.

In this disclosure, some control mechanisms for the SDT procedure are disclosed to solve the pending issues regarding the SDT procedure. First, an uplink timing advance issue during the SDT procedure is disclosed. Second, a design of the timer T319 that is triggered by the UE after the UE transmits the RRCResumeRequest message (or the RRCResumeRequest1 message) to the serving cell is disclosed. Moreover, some additional enhancements for the timer T319 or a new timer (e.g., the timer T319' or a (new) SDT timer presented in the 3GPP technical documents) are disclosed. Specifically, the UE behavior as to the timer T319' may follow the conventional timer T319 in the NR protocols with some additional changes when the UE performs an RRC-based SDT procedure. In some implementations, the UE may determine whether to select the RRCResumeRequest message or the RRCResumeRequest1 message for the SDT procedure according to a configuration received from the serving cell. For example, the serving cell may configure useFullResumeID=true in the broadcasting system information, such that after the UE receives the useDullResumeID in the broadcasting system information, the UE may use the RRCResumeRequest1 message (or use full resume UE ID) for the SDT procedure. By contrast, when the information element (IE), useFullResumeID, is absent, the UE may use the RRCResumeRequest message (or short I-RNTI) for the SDT procedure (e.g., the SDT-CG procedure and/or the SDT-RA procedure).

In some implementations, only the RRCResumeRequest message (or short I-RNTI) may be used during the SDT procedure, so the UE may not transmit RRCResumeRequest1 message (or full I-RNTI) during the SDT procedure. In some implementations, only the RRCResumeRequest message (or short I-RNTI) may be used during the SDT-CG procedure. In some implementations, both RRCResumeRequest and RRCResumeRequest 1 messages (short I-RNTI/full I-RNTI) may be transmitted during the SDT-RA procedure. In some implementations, the serving cell may explicitly configure whether to use RRCResumeRequest/RRCResumeRequest 1 messages (or full I-RNTI/short I-RNTI) for the SDT procedure (e.g., to be configured in the SDT configuration). In some implementations, for an RRC-based SDT procedure, the 'useFullResumeID' IE in the broadcasting system information (e.g., SIB1) may be ignored. In some implementations, the useFullResumeID 'IE may only be applied for an RRC resume procedure, and the RRC resume procedure for the SDT procedure may be performed based on the indication of the useFullResumeID' IE in the broadcasting system information.

In this disclosure, the issue caused by a UE mobility event may also be considered. Here, an anchor cell, as the serving cell, configures the SDT configuration to the UE and instructs the UE to move to the RRC inactive state. In some implementations, the SDT-CG configuration may be valid under the coverage of the anchor cell. However, in some implementations, the validity area of SDT-CG configuration may not be limited by the anchor cell.

Timing Advance Timer (TAT) for SDT-CG Configuration

In some implementations, an SDT-CG Timing Advance Timer (e.g., CG-TAT) may be configured for the UE to identify a valid time period of an uplink configured grant configured for the SDT procedure (e.g., an SDT-CG configuration). For example, the UE may be allowed to access the SDT-CG configuration when the CG-TAT is still counting/running, which means the UE maintains a valid UL timing advance (UL-TA) for UL transmission and/or SDT-CG procedure. In contrast, the UE may not be allowed to access the SDT-CG configuration by using the stored SDT-CG configuration directly when the CG-TAT expires/or is not running/or is stopped. That is, the UE may determine that the SDT-CG configuration is not available/valid. However, the UE may start/re-start the CG-TAT when the UE re-obtains the uplink timing advance from the serving cell (or the anchor cell) and stays in the RRC inactive state. In addition, once the CG-TAT has been started/re-started, the UE may determine that the SDT-CG configuration is available/valid again. Therefore, the UE may re-apply the SDT-CG configuration for the SDT procedure when the UE stays in the RRC inactive state, and the CG-TAT is running.

Details of the CG-TAT design are illustrated in Table 1 below.

TABLE 1

| No. | Mechanism |
| --- | --- |
| 1 | Triggering condition and initial value:<br>A CG-TAT may be triggered/(re)started after the UE moves to the RRC inactive state with SDT configuration (e.g., SDT-CG configuration/SDT-RA configuration) or when the UE moves to the RRC inactive state after the UE receives the RRCRelease (including 'suspendConfig' IE) message.<br>In some implementations, the UE may receive UL-TA information (e.g., a parameter/value of a TAT) with the SDT-configuration jointly in an RRC signal (e.g., RRCRelease message). After the UE receives the UL-TA information, the UE may trigger/(re)start the CG-TAT timer after/when the UE moves to the RRC inactive state or when the UE receives the RRCRelease (including 'suspendConfig' IE) message. In some implementations, the UE |

TABLE 1-continued

| No. | Mechanism |
|---|---|
| | may receive the UL-TA information (e.g., a parameter/value of a TAT) with the SDT-configuration during an SDT procedure (e.g., during the initial transmission or subsequent data transmission/reception). Then, the UE may trigger/(re)start the CG-TAT timer during the SDT procedure.<br>In some implementations, the UE may receive SDT configuration in an RRC signal (e.g., the RRCRelease message) without additional UL-TA information. In this case, an existing TAT (e.g., a legacy TAT) is running when the UE stays in the RRC connected state. In some implementations, the UE may receive SDT configuration in an RRC signal (e.g., the RRCRelease message) without additional UL-TA information, and the UE determines that the SDT configuration is valid when the existing TAT is running. In this case, the UE may not stop the existing TAT running when the UE transitions to the RRC_INACTIVE state. In some implementations, when the UE moves out of the anchor cell, the UE may not stop or release the CG-TAT (or the running legacy TAT). When the UE moves back to the anchor cell and the CG-TAT is still running, the UE may determine that the SDT configuration (e.g., the UL-CG configuration for the SDT procedure) of the anchor cell is valid.<br>In some implementations, the UE may trigger/set the initial value of the CG-TAT to a value of a running TAT when the UE moves to the RRC inactive state. Then, the CG-TAT may be (re)started to count to zero by the UE from the initial value. In some implementations, the UE may stop or release the running TAT (e.g., the running legacy TAT) at the same time when the UE (re)starts the CG-TAT.<br>It should be noted that, in some implementations, the initial value of the CG-TAT may be determined based on the following methods:<br>1. Pre-installed in the Universal Subscriber Identity Module (USIM) of the UE.<br>2. Pre-configured by the serving cell (or anchor cell) in the SDT configuration or UL-CG configuration that is transmitted to the UE via a UE-specific control signal (e.g., a DL RRC signal) or broadcasting system information.<br>3. Pre-defined in the 3GPP technical specifications. |
| 2 | Re-validation/Re-set of CG-TAT<br>The UE may receive the UL-TA information in the Timing Advance (TA) command via the Random Access Response (RAR) message or a "UL-TA MAC CE" (e.g., TA command MAC CE and/or absolute TA command MAC CE) from the anchor cell or non-anchor cell (e.g., after cell (re)selection procedure).<br>In some implementations, the UE may receive the (updated) UL-TA information from the anchor cell in (at least) one of the following conditions:<br>1. the UE may receive the UL-TA command via the RAR message from the anchor cell. In some implementations, the UL-TA command may be transmitted via a 2-step RA procedure (e.g., with the MSGB transmitted by the serving cell) or via a 4-step RA procedure (e.g., with the MSG2 transmitted by the serving cell).<br>2. The UE may receive one or more UL-TA MAC CEs from the anchor cell. In some implementations, the UL-TA MAC CE may be transmitted by the anchor cell via a 2-step RA procedure (e.g., with the MSGB transmitted by the serving cell) or via a 4-step RA procedure (e.g., with the MSG2/MSG4 transmitted by the serving cell). Here, the MSG4 may include the UL-TA MAC CE and an RRC signal (e.g., RRC(Connection)Release message, RRC(Connection)Setup message, RRC(Connection) Resume message, RRC(Connection)Re-establishment message).<br>It should be noted that, in some implementations, the UE may still receive one or more UL-TA MAC CEs when the UE transmits the subsequent UL packet transmissions to the serving cell after the SDT procedure is triggered. Then, the UE may update the CG-TAT (e.g., to start or restart the CG-TAT) each time the UE receives a UL-TA MAC CE during the sub-sequent UL packet transmission. The CG-TAT may be re-set to the initial/default value that is configured by the serving cell in the SDT configuration every time after the UE receives UL-TA information from the same anchor cell. In addition, the UE may re-start the CG-TAT after the CG-TAT is reset.<br>In some implementations, the CG-TAT is configured to the UE to count the validity time period of the SDT-CG configuration. In addition, the UE may update the UL timing advance during the data/control signaling exchange with the anchor cell, which may be implemented via the SDT-CG procedure and/or the SDT-RA procedure.<br>In some implementations, an ongoing CG-TAT may be reset/re-configured to a new (initial) value when the UE receives one new/updated SDT configuration that includes a new value for the CG-TAT. In this condition, the UE may re-configure the CG-TAT based on the new value for the CG-TAT. The UE may or may not receive UL-TA information along with the new/updated SDT configuration. In addition, the UE may re-start the CG-TAT once the CG-TAT is re-configured with the new value. |

TABLE 1-continued

| No. | Mechanism |
|---|---|
| 3 | In some implementations, the UE may receive UL-TA information from a non-anchor cell after the UE re-selects its serving cell to a non-anchor cell. It should be noted that the non-anchor cell may still locate on the valid area of (part of) the SDT configuration.<br>a. the UE may receive the TA command in a RAR message from the non-anchor cell. In some implementations, the TA command may be transmitted via a 2-step RA procedure (e.g., with the MSGB transmitted by the serving cell (or non-anchor cell)) or via a 4-step RA procedure (e.g., with the MSG2 transmitted by the serving cell (or non-anchor cell)).<br>b. The UE may receive one or more UL-TA MAC CEs from the non-anchor cell. In some implementations, the UL-TA MAC CE may be transmitted via a 2-step RA procedure (e.g., with the MSGB transmitted by the serving cell (or non-anchor cell)) or via a 4-step RA procedure (e.g., with the MSG4 transmitted by the serving cell (or non-anchor cell)). Here, the MSG4 may include the UL-TA MAC CE and an RRC signal (e.g., RRC(Connection)Release message, RRC(Connection)Setup message, RRC(Connection)Resume message, RRC(Connection)Re-establishment message).<br>c. The UE may not apply the UL-TA of the anchor cell (e.g., the $N_{TA}$ that is a positive or a negative amount for indicating advancing or delaying the uplink transmission timing and is associated with the anchor cell) when the UE transmits UL data/control signaling with other cells (no matter whether the SDT-CG configuration/SDT-RA configuration is valid to the concerned cell or not). In other words, the UE determines that the CG-TAT and the $N_{TA}$ maintained by the UE is valid for the anchor cell. In some implementations, the UE may re-set the $N_{TA} = 0$ (and release the CG-TAT associated with the anchor cell) when the UE performs the control signaling exchange, such as preamble transmission, or RRCResumeRequest/RRCResumeComplete message transmission (during an RRC Resume procedure), or RRCsetupRequest/RRCsetupComplete transmission (during an RRC establishment procedure), or RRCReestablishmentRequest/RRCReestablishmentComplete message transmission (during an RRC re-establishment procedure), with the non-anchor cell (e.g., the UE may transmit a selected preamble to the non-anchor cell by setting $N_{TA} = 0$). Please also note, the UE may implement the control signaling exchange with the non-anchor cell via a 2-step RA procedure or a 4-step RA procedure.<br>d. In some implementations, the UE may apply the SDT-CG configuration for the non-anchor cell. In this condition, the UE may update the NTA. Then, the UE may trigger a new CG-TAT associated to this non-anchor cell after the UE obtains UL-TA information from this non-anchor cell. Moreover, if a cell reselection happens and the SDT-CG configuration is still valid to the next selected non-anchor cell, then the UE may re-start the $N_{TA}$, update the CG-TAT, and/or restart the CG-TAT again.<br>e. In some implementations, a non-anchor cell may become an anchor cell to the UE when the context fetch procedure is realized in the RAN (e.g., the UE's connection to the CN is maintained by a new neighbor cell (e.g., a new serving cell for the UE). The original anchor cell may transfer the stored UE context to the new neighbor cell. Then, the new neighbor cell may become a new anchor cell to the UE. In this condition, the UE may release the original NTA/CG-TAT associated with the original anchor cell. In addition, the UE may start a new CG-TAT associated with the new anchor cell and maintain the stored NTA associated with the new anchor cell. |
| 4 | In some implementations, the UE may trigger the SDT procedure via the SDT-CG configuration for the UL-TA update procedure._<br>a. RRC-less mechanism<br>In some implementations, the UE may still transmit a UL packet even though no pending packet is in the UE (e.g., no pending packet data units (PDUs) in the logical channels/radio bearers that are enabled to access SDT resources). In other words, the UL packet is triggered just for a UL-TA update procedure. In this condition, the UE may also transmit one Buffer Status Report during the RA procedure (triggered for the UL-TA update procedure), where the Buffer Status Report indicates zero/none pending packet in the UE.<br>In some implementations, the UE may generate and transmit a TA-Request command (e.g., UL-TA MAC CE) to the serving cell via the SDT-CG resources. More specifically, the UL packet may include assistance information for the UL-TA update procedure. In another implementation, the UE may transmit a preamble in order to receive a UL-TA MAC CE in a RAR message without transitioning to the RRC_CONNECTED state.<br>b. RRC-based mechanism<br>In some implementations, the UE may transmit a UL packet with an RRC message (e.g., RRCResumeRequest message) even though no pending packet is in the UE. In this condition, the UL packet is triggered for the UL-TA update procedure.<br>c. In some conditions, a Downlink Reference Signal Received Power (DL-RSRP)/Downlink Reference Signal Received Quality (DL-RSRQ) threshold may be pre-configured to limit the UE to start an SDT procedures (e.g., the SDT-CG procedure and/or the SDT-RA procedure). For example, the UE may trigger the SDT-CG/SDT-RA procedure when the UE determines that the DL- |

TABLE 1-continued

| No. | Mechanism |
|---|---|
| | RSRP/DL-RSRQ value is higher than (or equivalent to) the given DL-RSRP/DL-RSRQ threshold. For example, the UE may trigger the SDT-CG/SDT-RA procedure when the UE determines that the DL-RSRP/DL-RSRQ associated to (at least) a Synchronization Signal Block (SSB) is higher than the given DL-RSRP/DL-RSRQ threshold and the corresponding SSB is associated to the UL-CG (or RA resources) for the UE to perform the SDT-CG/SDT-RA procedure.<br>In some implementations, for the UL-TA update procedure, the UE may (e.g., be defined in the 3GPP technical specification or be enabled by the serving cell via a UE-specific RRC signal/UE-specific MAC CE or broadcasting system information) start the SDT-CG/SDT-RA procedure, regardless the limitation of DL-RSRP threshold for triggering the SDT procedure. In some implementations, the UE may generate and transmit the UL-TA update request message (e.g., a UL RRC message or a MAC CE generated by the UE) to the serving cell via the SDT-CG resource or SDT-RA resource. In some implementations, the UE may follow the restrictions about SDT-CG/SDT-RA procedures to transmit the UL packet for the UL-TA update request message.<br>d. In some conditions, the SDT-PacketLowBound threshold may be pre-configured to limit the UE to start an SDT procedure (e.g., the SDT-CG procedure and/or the SDT-RA procedure). For example, the UE may trigger the SDT-CG/SDT-RA procedure when the UL packet pending in the UE buffer reaches up to (or great than) a given UL-PacketSize. It should be noted that the counting of UL pending packet may only count the logical channel(s)/radio bearer(s) that is enabled or configured to access the SDT-CG resources/SDT-RA resources.<br>However, for the UL-TA update procedure, the UE may (e.g., be defined in the 3GPP technical specification or be enabled by the serving cell via a UE-specific RRC signal/UE-specific MAC CE or broadcasting system information) start the SDT-CG/SDT-RA procedure (without multiplexed packet) regardless the requirement of SDT-PacketLowBound threshold. |
| 5 | The CG-TAT is configured to the UE to count the validity time period of the SDT-CG configuration (associated with the anchor cell).<br>a. The SDT-CG configuration may become invalid when the CG-TAT expires or is not running (e.g., the CG-TAT is stopped or released).<br>In some implementations, the UE may release the SDT-CG configuration directly right upon/after the CG-TAT expires.<br>In some implementations, the UE may suspend the SDT-CG configuration directly right after the CG-TAT expires or is not running.<br>In some implementations, the UE may determine whether to release the SDT-CG configuration based on a NW command/configuration when the SDT-CG configuration is considered invalid (e.g., the associated CG-TAT expires or is not running).<br>In some implementations, the UE may not release the invalid SDT-CG configuration. Instead, once the UE re-obtains the UL-TA from the anchor cell, the UE may re-access the SDT-CG configuration for the SDT procedure. For example, the UE may consider the SDT-CG configuration (associated with the anchor cell of the UE) may become invalid after the UE re-select to another non-anchor cell (e.g., via a cell re-selection procedure). However, the UE may still keep/store the invalid SDT-CG configuration if the UE does not transmit RRCResumeRequest message to the non-anchor cell yet. In this condition, the in-valid SDT-CG configuration may be considered valid again if the UE re-select to the anchor cell (e.g., via another cell re-selection procedure) and the CG-TAT (associated with the stored SDT-CG configuration) is re-started/re-activated again.<br>In some implementations, once the UE re-obtains the UL-TA from the anchor cell, the UE may re-initialize/re-validate/re-activate the SDT-CG configuration for the SDT procedure.<br>b. The expiry of CG-TAT may not impact the SDT-RA configuration configured by the same anchor cell. However, in some implementations, the UE may trigger the SDT-RA procedure by using the stored UL-TA (e.g., the $N_{TA}$ that is associated with the active CG-TAT) when the UE transmits the selected preamble to the anchor cell for the SDT procedure. In some implementations, the UE may apply the SDT-RA procedure by setting $N_{TA} = 0$ even though the UE has a stored $N_{TA}$ value associated with SDT-CG configuration. In other words, because the UE may re-obtain a UL-TA command in the following RAR message, so that the UE may not use the stored $N_{TA}$ in the RA procedure. This condition may happen not only for the SDT-RA procedure but also in a normal (2-step/4-step) RA procedure (e.g., RRC Resume/establishment/re-establishment procedure or on-demand SI procedure) triggered with the same anchor cell. It should be noted that, if the UE obtains the UL-TA information in the RAR message from the serving cell during the RA procedure, the UE may update the stored NTA that is associated with the SDT-CG configuration based on the UL-TA information received in the RAR message. In addition, the CG-TAT may also be re-started (from the stopped value or from its default initial value) to count to zero after the $N_{TA}$ value is updated. It should be noted that the UE may re-validate an invalid SDT-CG configuration by triggering a (2-step/4-step) RA procedures, so that the |

TABLE 1-continued

| No. | Mechanism |
|---|---|
| | SDT-CG configuration may become valid again after the UE re-obtains the UL-TA.<br>c. In some implementations, the UE triggers a (2-step/4-step) RA procedure for the SDT-RA procedure when the CG-TAT is running. In this condition, the UE may transmit the preamble (e.g., the MSG1 in the 4-step RA procedure) or the MSGA in the 2-step RA procedure based on the maintained UL-TA (e.g., the stored $N_{TA}$) when the CG-TAT is still running. In some implementations, even if the CG-TAT is still running, the UE may transmit the MSG1/MSGA by setting the UL-TA =0 (e.g., the UE may transmit MSG1/MSGA by setting NTA=0). In some implementations, if the UE receives a TA command in a RAR message when the CG-TAT is running, the UE may ignore the TA command. Moreover, the UE may (re-)start or may not (re-)start the CG-TAT when the UE receives a TA command in RAR and ignores the TA command. |
| 6 | In some implementations, a UL-TA request procedure (and or the previously mentioned fallback procedure) may be triggered before the CG-TAT is going to (but not yet) expire. In some implementations, the UE may transmit the UL-TA update request message via the SDT-CG procedure/SDT-RA procedure, or normal RA procedure (e.g., RRC Resume/re-establishment/establishment procedure or SI on-demand procedure). The UL-TA update request message may be implemented as the UL-RRC signal or MAC CE. In some implementations, the UL-TA update request message may be an implicit message. For example, when the UE transmits a UL packet via the SDT-CG resource, the NW may update the TA for the UE when the NW receives the UL packet (e.g., via one or more UL-TA adjust instruction(s)). More specifically, the UE may monitor PDCCH after the UE transmits the UL packet (for a pre-configured period on a specific CONTROL RESOURCE SET (CORESET)/search space). More specifically, the UE may receive a TA command and/or ACK/NACK information based on the PDCCH monitoring. Moreover, in some implementations, a time span length (e.g., $X_{SDT-TA}$ symbols, time slots, radio frame, milliseconds) may be pre-defined to the UE, so that the UE may trigger the UL-TA update procedure when the SDT-TAT is lower than (or equivalent to) the pre-defined/pre-configured $X_{SDT-TA}$. In some implementations, the UL-TA request procedure (and or the fallback procedure) may be triggered (right) after the CG-TAT expires. |
| 7 | BWP-switching<br>In some implementations, the UE may stay in a UE-specific DL-BWP/UL-BWP that are configured to the UE for the SDT procedure when the CG-TAT is running. Then, after the CG-TAT expires, the UE may switch from the UE-specific DL-BWP/UL-BWP to the initial DL-BWP/UL-BWP.<br>In some implementations, the UE may switch to the initial DL-BWP/UL-BWP to re-obtain the UL-TA information from the serving cell (e.g., the UE may re-obtain UL-TA information from the serving cell via an RA procedure). Then, after the UE obtains the UL-TA and re-starts the CG-TAT to be counted to zero, the UE may switch back to the UE-specific DL-BWP/UL-BWP for the SDT procedure. |
| 8 | MAC entity implementation when the CG-TAT expires<br>When the CG-TAT expires, in the MAC entity, the UE may release the buffer MAC PDUs if the CG-TAT expires. In some implementations, the UE may reset the MAC entity if the CG-TAT expires. In some implementation, the UE may flush all HARQ buffers if the CG-TAT expires. In some implementation, the UE may initiate an RA procedure (e.g., an SDT-RA procedure or an RRC procedure with 2-step/4-step RA type) for the following SDT procedure (if there is any pending SDT-enabled packets) if the CG-TAT expires. |

Implementation #2: SDT Failure Event and Fallback Mechanism Triggered by CG-TAT Expiry In some implementations, the CG-TAT may be still counting/running when the UE performs the SDT procedure. However, the CG-TAT may be expired before or during the SDT-CG procedure (and/or the following subsequent DL/UL data/signaling exchange after the SDT procedure is triggered). Details about the CG-TAT expiry triggers an SDT failure event and/or fallback mechanisms are illustrated in Table 2 below.

TABLE 2

SDT failure event and fallback mechanisms (caused by CG-TAT expiry)

1 In some implementations, the CG-TAT may be expired when the UE accesses the configured SDT-CG configuration for the SDT procedure, and the multiplexed packet is still pending in the UE. In this condition, the CG-TAT expiry may trigger the UE to fallback to access the SDT-RA configuration for transmitting the pending packets (e.g., fallback to the SDT-RA procedure). The UE may stop an active SDT-CG procedure and then trigger an SDT-RA procedure for the UL-TA update request message. The SDT-RA procedure may be a 2-step RA procedure or a 4-step RA procedure for a transmission of the UL-TA update request message.

TABLE 2-continued

SDT failure event and fallback mechanisms (caused by CG-TAT expiry)

|   |   |
|---|---|
|   | In some implementations, the UE may not fallback to the SDT-RA procedure (e.g., because of the size limitation of the pending packets or because of DL Reference Signal Received Power (RSRP) threshold for the SDT-RA procedure). In this condition, the UE may trigger an RRC procedure (e.g., RRC Resume procedure) with the anchor cell (or non-anchor cell) for a pending packet transmission. |
|   | In the fallback procedure, the UE may re-obtain a UL-TA information from the anchor cell (or non-anchor cell) during the SDT-RA procedure (e.g., by receiving the RAR message from the anchor cell (or non-anchor cell) or a UL-TA MAC CE from the anchor cell (or non-anchor cell) during the sub-sequent data/control signaling exchange). Then, the CG-TAT may be restarted while the UE re-obtains the UL-TA information. |
|   | In some implementations, the UE may keep the stored SDT-CG configuration after the CG-TAT expires. Moreover, after the UE updates UL-TA during the fallback procedure (or RRC Resume procedure), the UE may trigger the SDT-CG procedure by accessing the stored SDT-CG configuration again. Moreover, the CG-TAT may be re-started when the UL-TA is updated. |
|   | In some implementations, the encoded packets buffered in the MAC layer of the UE may not be released (e.g., the UE may not flush HARQ buffer) when the CG-TAT expires. In addition, the UE may transmit the pending packets via the fallback procedure. For example, the pending packets may be transmitted via the UL grant provided by the RAR message or transmitted vian MSGA. |
|   | In some implementations, the active HARQ procedures activated/proceeded during the SDT-CG procedure may be released when the CG-TAT expires. In some implementations, the active HARQ procedure may not be released when the CG-TAT expires. |
| 2 | In some implementations, the RRC entity/MAC entity of the UE may determine that an SDT failure event happens when the CG-TAT expires during the SDT-CG procedure. |
|   | In some implementations, the UE may determine an SDT failure event happens only when the CG-TAT expires, and the UE is not configured with SDT-RA configuration. In other words, the UE may not announce the SDT failure event when the UE fallbacks to the SDT-RA procedure. |
| 3 | The UE may perform at least one of the following actions when an SDT failure event happens:<br>1. The UE may move from the RRC inactive state to RRC idle state.<br>2. The UE may start an RRC procedure (e.g., RRC Resume procedure if the UE stays in the RRC inactive state after the SDT failure event is declared or RRC establishment procedure if the UE moves to the RRC idle state after the SDT failure event is declared).<br>3. The UE may release (part of) the stored SDT-configuration (e.g., SDT-CG configuration and/or SDT-RA configuration).<br>4. In the MAC entity, the UE may release the buffered MAC PDUs if SDT failure event is declared in the UE. In some implementations, the UE may reset MAC entity if SDT failure event is declared in the UE. In some implementation, the UE may flush all ARQ/HARQ buffers if SDT failure event is declared in the UE. In some implementation, the UE may initiate an RA procedure (with 2-step/4-step RA type) if SDT failure event is declared in the UE.<br>5. The UE may store the SDT failure event, and next time when the UE connects with the serving RAN again (e.g., anchor cell or non-anchor cell), the UE may transmit the SDT failure report to the serving RAN. (e.g., the UE may indicate "SDT-Failure Report available" in a UL control signaling, such as RRC signal. After the serving cell receives the "SDT-Failure Report available" indicator, the serving cell may enquiry the UE to transmit the SDT failure report to the serving cell. In some implementations, the SDT failure report may be transmitted to the serving RAN via Early Measurement Report procedure. The content included in an SDT failure report may include information related to SDT-CG failure (e.g., no ACK/NACK received from network or UL-TA request procedure failed), the information related to SDT-RA failure (e.g., a 2-step RA SDT failure or a 4-step RA SDT failure), or the information related to the cell failed for the SDT procedure (e.g., cellidentity of the anchor cell/serving cell), but is not limited to.<br>6. In some implementations, the SDT failure event may be triggered when the DL-RSRP/DL-RSRQ value is lower than a given DL-RSRP/DL-RSRQ threshold during the SDT-procedure. For example, the SDT failure event may be triggered when the DL-RSRP/DL-RSRQ value of an SSB is lower than a given DL-RSRP/DL-RSRQ threshold and the all (or part of) the UL-CG configurations that the UE uses during the SDT-procedure are associated to the SSB(s) whose DL-RSRP/DL-RSRQ value is lower than the given DL-RSRP/DL-RSRQ threshold.<br>7. In some implementations, the PHY layer related problems may also cause SDT failure event. For example, the RRC entity may receive up to N310' consecutive out-of-sync indications from the PHY layer. Then, the RRC entity may trigger T310' and count the number of in-sync indications from the PHY layer. The counting T310' may be stopped if the RRC entity receives up to N311' continuous in-sync indications from the PHY layer. Otherwise, the T310' may expire and the UE (e.g., the RRC entity of the UE) may determine that PHY related problem happens. In some implementations, the UE may determine that an SDT failure event happens if T3 10' expiry happens during the SDT procedure |

TABLE 2-continued

SDT failure event and fallback mechanisms (caused by CG-TAT expiry)

(e.g., the SDT-CG procedure and/or SDT-RA procedure). In some
implementations, T310' expiry may happen when the UE stays in the RRC
inactive state. In this condition, the UE may not perform the SDT procedure (e.g.,
neither SDT-CG procedure nor SDT-RA procedure) after T310' expiry. In some
implementations, the UE may move to the RRC idle state when T310' expires.
In some implementations, the UE may trigger RRC re-establishment procedure
(or RRC resume procedure) to find a serving cell after T310' expires.
8. The "SDT-Failure cause" may be included in the SDT failure report. For
example, the "SDT-Failure cause" may include the following parameters: 'ARQ
re-transmission number reaches to a maximum threshold', 'Timing advance
Timer Expire', 'DL-RSRP (associated with the serving cell) is/becomes lower
than a threshold', 'Out-of-sync event (e.g., T310' expires during the SDT
procedure or T311 expires when the UE stays in the RRC inactive state)'.

4 BWP switching
a. In some implementations, the UE may stay in a UE-specific DL-
BWP/UL-BWP that are configured to the UE for the SDT procedure when an
SDT failure event is declared in the UE.
b. In some implementations, the UE may move (from the UE-specific DL-
BWP/UL-BWP configured for the SDT-procedure) to the initial DL-BWP/UL-
BWP of the anchor cell when the SDT failure event is declared in the UE.
c. In some implementations, the UE may move (from the UE-specific DL-
BWP/UL-BWP configured for the SDT-procedure) to the initial DL-BWP/UL-
BWP of the anchor/serving cell when the UE release the SDT configuration. In
some implementations, the UE may stay in the UE-specific DL-BWP/UL-BWP
(configured for SDT-procedure) when the UE release the SDT configuration.
d. In some implementations, the UE may move (from the UE-specific DL-
BWP/UL-BWP configured for the SDT-procedure) to the initial DL-BWP/UL-
BWP (of the anchor cell/serving cell) if the UE fallbacks to start an RRC
(Resume, re-establishment, establishment) procedure to the serving cell (without
additional UL packet transmission). In some implementations, the UE may stay
in the UE-specific DL-BWP/UL-BWP (configured for the SDT procedure) when
the UE fallbacks to start an RRC Resume procedure (without additional UL
packet transmission).

Implementation #3: Mobility Event for SDT Procedure

Detailed design about a mobility event for the SDT procedure is illustrated in Table 3 below.

TABLE 3

| No. | Mobility event for SDT procedure |
|---|---|
| 1 | In some implementations, the SDT-CG configuration may become invalid when the UE moves out of the validity area of the SDT-CG configuration. The validity area may be defined based on (at least) one of the following rules:<br>a. In some implementations, the validity area of the SDT-CG configuration may be (in default) the coverage of the serving cell that configures the SDT-CG configuration to the UE (e.g., the anchor cell that instructs the UE to move to the RRC inactive state and keeps the RAN-CN connection associated with the UE and the CN that serves the UE). In this condition, the SDT-CG configuration may become invalid when the UE (re)selects to other serving cell that is not included in the validity area due to UE mobility event.<br>a1. For another example, the validity area of the SDT-CG configuration may refer to a set of cells supporting the network slice (or RAN slice or Single-Network Slice Selection Assistance Information (S-NSSAI)) that corresponds to the SDT procedure. Thus, when the UE performs cell reselection and camps on a new serving cell (or reselects a suitable cell) not supporting the network slice (or RAN slice or S-NSSAI) corresponding to the SDT procedure, the UE determines that the SDT-CG configuration becomes invalid. When the UE reads the system information broadcast/unicast by the new serving cell (or the suitable cell) not including the information of network slice (or RAN slice or S-NSSAI) corresponding to the SDT procedure, the UE may determine that the new serving cell (or the suitable cell) does not support the SDT procedure and/or determine that the SDT-CG configuration becomes invalid.<br>b. In some implementations, a DL signal strength threshold (e.g., DL-RSRP threshold or DL-RSRQ threshold) may be configured with the SDT-CG configuration. In addition, the UE may access the SDT-CG configuration only when the monitored DL-RSRP value or DL-RSRQ value associated with the SDT-CG configuration is higher (or equivalent to) the given DL-RSRP/DL-RSRQ threshold. In contrast, the SDT-CG configuration may become invalid if the UE receives DL-RSRP value from the serving cell configures the SDT-CG configuration to the UE is lower than the given DL-RSRP threshold. Please also note, in some implementations, the UE may be configured with one or more SDT-CG configurations for the SDT procedure. Each SDT-CG configuration may be associated with one periodical/semi-persistent-scheduled |

TABLE 3-continued

| No. | Mobility event for SDT procedure |
|---|---|
| | UL radio resource for the UE to transmit uplink packets while the UE stays in RRC INACTIVE state. In some implementations, each SDT-CG configuration may be associated with one or more Synchronization Signal/Physical Broadcast Channels (SSBs) in the DL direction and the UE may determine whether to access one SDT-CG configuration by measuring the DL-RSRP value of the SSBs associated with the SDT-CG configuration. The UE may determine to access one SDT-CG configuration for SDT procedure if the DL-RSRP measurement result is higher (or not smaller than/equivalent to) a pre-configured DL-RSRP threshold. In contrast, the UE may determine not to access one SDT-CG configuration for the SDT procedure if the DL-RSRP measurement result is lower (or not higher than/equivalent to) the pre-configured DL-RSRP threshold. Please note, in some implementations, the UE may measure the DL-RSRP measurement result during a running/active SDT procedure and may choose different SDT-CG configurations during the SDT procedure for uplink packet transmissions. In some implementations, the UE may have one or more active SDT-CG configuration(s) for the SDT procedure and may change the combinations of operating/active SDT-CG configuration(s) during the SDT procedure based on the DL-RSRP measurement results. In this condition, the UE may consider a running SDT-CG procedure fails if the UE may not find out any SDT-CG configuration, which its associated DL-RSRP measurement result (determined based on the SSBs associated with the SDT-CG configurations) is higher (or equivalent to) the pre-configured DL-RSRP threshold.<br>In some implementations, the UE may not change its active/operating SDT-CG configuration during the SDT procedure, and the UE may consider an SDT failure event happens when the DL-RSRP measurement result associated with the active SDT-CG configuration is lower than a pre-configured DL-RSRP threshold.<br>Please also note, in some implementations, the pre-configured DL-RSRP threshold may be configured to the UE as a per-UE-specific threshold (in other words, all of the SDT-CG configurations may be associated with one common DL-RSRP threshold). In some other implementations, the pre-configured DL-RSRP threshold may be configured to the UE as a per-SDT-CG-specific threshold (in other words, each SDT-CG configuration may be associated with one independent DL-RSRP threshold). In some additional implementations, the pre-configured DL-RSRP threshold may be configured to the UE as a per-SSB-specific threshold (in other words, all of the SDT-CG configurations associated with the same SSB may also be associated with one common DL-RSRP threshold and the SDT-CG configurations associated with different SSB may also be associated with one independent DL-RSRP threshold).<br>b1. For another example, the SDT-CG configuration may associate with particular SSB(s). When the DL-RSRP/DL-RSRQ values of the particular SSB(s) are lower than (or equivalent to) the DL-RSRQ/DL-RSRQ thresholds, the UE may determine that the SDT-CG configuration becomes invalid.<br>c. In some other implementations, the validity area of the SDT-CG configuration is determined based on the celledge evaluation result. For example, the UE may be configured with celledgeevaluation = true. Moreover, two parameters { $S_{SearchThresholdP}$, $S_{SearchThresholdQ}$} may also be configured to the UE for cell edge evaluation. Therefore, the UE may determine it is not in the cell edge when the received DL signal strength is conformed to the following formulas:<br>Srxlev > $S_{SearchThresholdP}$, and<br>Squal > $S_{SearchThresholdQ}$, if $S_{SearchThresholdQ}$ is configured, where:<br>Srxlev = current Srxlev value of the serving cell (dB), and<br>Squal = current Squal value of the serving cell (dB).<br>The UE may not perform intra-frequency measurement/inter-frequency measurement if the UE is not in the cell edge. In addition, the stored SDT-CG configuration is valid only when the UE is not in the cell edge. Otherwise, the SDT-CG configuration may be considered invalid when the UE considers it is in the cell edge.<br>In some implementations, the UE may not determine the validity of an SDT procedure when one SDT procedure is activated.<br>In some implementations, the UE may apply the previously mentioned criteria to justify whether an on-going SDT procedure is continued or not (e.g., whether subsequent DL/UL data exchange is continued). In some conditions, the UE may abort/stop an on-going SDT procedure (and sub-sequent data exchange) when the UE moves out of the valid area(s) of the associated SDT configuration.<br>d. In some implementations, the UE may count the CG-TAT if the CG-TAT is still active when the UE moves out of the valid area of the SDT-CG configuration (e.g., upon the UE moves from an anchor cell to a non-anchor cell after a cell (re)selection procedure).<br>d1. The UE may count the CG-TAT when the DL-RSRP value is lower (or equivalent to) the DL-RSRP threshold. |

TABLE 3-continued

| No. | Mobility event for SDT procedure |
|---|---|
| | d2. The UE may count the CG-TAT when the UE moves out of the coverage of anchor cell (when the stored SDT configuration is valid only under the radio coverage of anchor cell). |
| | In addition, the UE may determine that the invalid SDT-CG configuration becomes valid again when the UE moves back to the valid area of the SDT-CG configuration (e.g., the UE moves back to the original serving cell after cell (re)selection procedure, or the UE monitors the DL-RSRP value(s) (e.g., the DL-RSRP measurement result associated with the SDT-CG configuration and/or the DL-RSRP measurement result associated with the camped cell) is higher than the given DL-RSRP threshold again) and when the CG-TAT is still counting. |
| | d3. In some implementations, the stored SDT-CG configuration may be invalid when the UE moves back to the valid area associated with the SDT-CG configuration, but the CG-TAT already expires. The UE may release the stored SDT-CG configuration due to the expiry of CG-TAT. However, the stored SDT-RA configuration may not be released due to the CG-TAT expiry. |
| | d4. In some implementations, the UE may release/removed the CG-TAT and/or the associated SDT-CG configuration/SDT-RA configuration after the UE moves out of the valid area of the corresponding SDT configuration (e.g., the DL cell coverage of the anchor cell). |
| 2 | a. After the UE moves out of the anchor cell that configures SDT configuration to the UE and re-camps on a serving cell, the UE may stop the counting CG-TAT and/or release the SDT configuration when the UE starts an RRC procedure with the camped cell. It should be noted that the RRC procedure may include the RRC Resume procedure, RRC re-establishment procedure, and RRC establishment procedure. |
| | a1. In some implementations, the UE may stop the CG-TAT when an RA procedure is initiated/triggered in the MAC entity of the UE for the RRC procedure. |
| | a2. In some implementations, the UE may stop the CG-TAT when the UE transmits the preamble that is pre-indicated by the serving cell for a CFRA procedure or may be selected by the UE for a CBRA procedure to the serving cell via the MSG1 (e.g., 4-step RA procedure) or MSGA (e.g., 2-step RA procedure). |
| | a3. In some implementations, the UE may stop the CG-TAT when the UE receives the RAR message that includes TA command from the serving cell. In addition, another TAT that is used by the UE to count the validity of UL-TA may be initiated to be counted to zero after the UE receives the TA command from the serving cell (e.g., via the RAR message). |
| 3 | BWP switching |
| | a. Cell (re)selection procedure |
| | After the cell (re)selection procedure, the UE may switch from the UE-specific DL-BWP/UL-BWP that is pre-configured for data transmission when the UE stays in the RRC inactive state to the initial DL-BWP/UL-BWP of the newly camped cell after the cell (re)selection procedure. |
| | In some implementations, the UE may switch back to the UE-specific DL-BWP/UL-BWP that are configured for the SDT procedure (e.g., an SDT-CG procedure or an SDT-RA procedure) when the UE moves back to the (original) anchor cell that configures the SDT configuration to the UE due to the cell (re)selection procedure and the stored SDT configuration associated with the anchor cell is still valid in the UE. Otherwise, the UE may move to the initial DL-BWP/initial UL-BWP of the (original) anchor cell after the UE re-camps to the (original) anchor cell again. The SDT configuration of the (original) anchor cell may/may not be released by the UE when the UE moves out of the coverage of the (original) anchor cell. |
| | b. Validity area |
| | In some implementations, the UE may switch from the UE-specific DL-BWP/UL-BWP to the initial DL-BWP/UL-BWP (of the anchor cell) when the UE moves out of the validity area of an SDT configuration (e.g., SDT-CG configuration and/or SDT-RA configuration). For example, the UE may obtain a DL-RSRP that is lower than a given DL-RSRP threshold associated with the SDT-CG configuration that is associated with the UE-specific UL-BWP (and is also the operating UL-BWP of the UE). When the DL-RSRP value is lower than the given DL-RSRP threshold, the UE may switch from the UE-specific BWP to the initial UL-BWP. |
| | In some implementations, the UE may switch back to the UE-specific DL-BWP/UL-BWP that are configured for the SDT procedure when the UE moves back to the validity area of the associated SDT configuration and the stored SDT configuration associated with the anchor cell is remained valid in the UE. For example, the UE may obtain a DL-RSRP value that is higher than a given DL-RSRP associated with the SDT-CG configuration. Then, after the UE determines that the DL-RSRP value is higher than the DL-RSRP threshold, the UE may switch from the initial UL-BWP to the UE-specific BWP again. In |

TABLE 3-continued

| No. | Mobility event for SDT procedure |
|---|---|
| | contrast, the UE may move to the initial DL-BWP/initial UL-BWP of the (original) anchor cell after the UE moves back to the validity area of the SDT configuration. It should be noted that the SDT configuration may/may not be released by the UE when the UE moves out of the validity area of the associated SDT configuration. |

Implementation #4: Impact of RRC Stats and RRC Procedures

Table 4 below illustrates the CG-TAT counting and the RRC state transition. Moreover, the timer T319' applied by the UE to identify whether a failure event happens during the SDT procedure is also illustrated in Table 4.

TABLE 4

| No. | Mechanisms |
|---|---|
| 1 | a. In some implementations, the UE may release the configured SDT-CG configuration and move to the RRC idle state if the CG-TAT expires.<br>b. In some implementations, the UE may release the configured SDT-CG configuration and stay in the RRC inactive state if the CG-TAT expires. In some implementations, the UE may release the CG-TAT and SDT-configuration (e.g., SDT-CG configuration/SDT-RA configuration) when the UE moves to the NR RRC idle state.<br>c. In some implementations, the UE may release the CG-TAT (and/or the stored SDT configuration) when the UE moves to the LTE RRC idle state from the NR RRC inactive state. (e.g., the UE re-selects to a E-UTRAN cell after the cell (re)selection procedure).<br>d. After CG-TAT expiry, part of the SDT configuration (e.g., SDT-RA configuration) may be still stored by the UE. In addition, the UE determines that the stored SDT-RA configuration is valid for the SDT procedure.<br>e. In some implementations, the counting CG-TAT may be still counting/running after the UE moves to (NR) RRC idle state. Thus, the UE may not release the SDT-CG configuration associated with the CG-TAT after the UE moves to the RRC idle state. Instead, the UE may release the stored SDT-CG configuration due to the CG-TAT expiry. Moreover, in some conditions, the UE may still be able to re-obtain the UL-TA information from the serving cell that may or may not be the original anchor cell of SDT configuration. In some implementations, the UE may initiate an RRC establishment procedure when the CG-TAT is still counting. The stored SDT-CG configuration may be re-validated again (and the counting CG-TAT may be re-set by the UE) after the UE receives a RAR message with a TA command from the anchor cell. In some implementations, the stored SDT-CG configuration may be re-validated only when the UE moves back to the RRC connected state (e.g., based on the DL control signaling instructed by the serving cell). |
| 2 | a. In some implementations, the UE may release the configured SDT configuration and move to the RRC idle state when an SDT failure event is declared (by the RRC entity of the UE).<br>b. In some implementations, the UE may release the configured SDT configuration and stay in the RRC inactive state when an SDT failure event is declared (by the RRC entity of the UE).<br>c. After the CG-TAT expiry, part of the SDT configuration (e.g., SDT-RA configuration) may be still stored by the UE. In addition, the UE may determine that the stored SDT-RA configuration is still valid for the SDT procedure.<br>d. In some implementations, the counting CG-TAT may be still counting/running after the UE moves to (NR) RRC idle state. In addition, the UE may not release the SDT-CG configuration associated with the CG-TAT after the UE moves to the RRC idle state. Instead, the UE may release the stored SDT-CG configuration due to the CG-TAT expiry.<br>e. In some conditions, the UE may re-obtain the UL-TA information from the serving cell that may or may not be the original anchor cell of SDT configuration. In some implementations, the UE may initiate an RRC establishment procedure when the CG-TAT is still counting. the UE may determine that the stored SDT-CG configuration is re-validated again after the UE receives a RAR message with a TA command from the anchor cell. In some implementations, the stored SDT-CG configuration may be re-validated only when the UE moves back to the RRC connected state (e.g., based on the DL control signaling instructed by the serving cell). |
| 3 | During the SDT procedure, the RRC signaling (e.g., RRCResumeRequest message) may be generated and transmitted jointly with the encoded small packet(s). In some implementations, the timer T319' may also be configured. The UE behavior as to the timer T319' may include:<br>a. Triggering condition of T319'<br>In some implementations, the UE may (re-)start the timer T319' when an |

TABLE 4-continued

| No. | Mechanisms |
|---|---|
| | encoded (UL) packet is transmitted (with/without the RRCResumeRequest or RRCResumeRequest message in the same transmitted Physical Transport Block). In some implementations, the timer T319' may be re-started if the UE (re)transmits another UL packet to the serving cell during the same SDT procedure for the subsequent data transmission. Moreover, the timer T319' may be stopped when the UE receives the response (e.g., a DL RRC messages, a HARQ ACK/NACK message for the transmitted UL packet, DL packets) from the serving cell during the SDT procedure (and/or during the subsequent DL/UL data exchange, which may or may not be considered as part of the SDT procedure). The UE may keep counting timer T319' to zero unless the running timer T319' is stopped or released or reset during the on-going SDT procedure (e.g., SDT-CG procedure or SDT-RA procedure). In some implementations, the on-going SDT procedure (and/or the subsequent DL/UL packet exchange) may be stopped/released/dropped/interrupted due to the expiry of T319'. In some implementations, the timer T319' may be triggered/(re)-started during an RRC-based SDT procedure or during an RRC-less SDT procedure. In some implementations, the UE may (re-)start timer T319' when a DL signaling (e.g., a DCI, a HARQ feedback, a TA command) from the NW is received when the UE is in the RRC inactive state (during an SDT procedure). In some implementations, the UE may (re-)start timer T319' when the CG-TAT is (re)started.<br>b. Stop condition of timer T319'<br>b1. The timer T319' may be stopped when the UE receives an RRC signaling (e.g., RRCResume, RRCSetup, RRCRelease, RRCreject, RRC-re-establishment message) from the serving cell.<br>b2. In some implementations, the UE may stop the timer T319' when the UE moves out of the valid area of the SDT configuration (e.g., due to cell re-selection) during the SDT procedure. In some implementations, the UE may keep counting the timer T319' even after the UE moves out of the valid area of the SDT configuration (or when the SDT configuration becomes invalid). In other words, the triggered SDT procedure may not be interrupted when the UE moves out of the valid area of the SDT configuration while the timer T319' is still counting/running/active.<br>b3. The UE may stop the timer T319' when the running CG-TAT expires during the SDT-procedure (e.g., no response is received from the serving RAN and the CG-TAT expires during a CG-SDT procedure).<br>b4. The UE may stop the timer T319' when a radio link failure event or SDT failure event is announced during the SDT procedure.<br>c. Expiry condition of timer T319'<br>c1. In some implementations, the UE may move to the RRC idle state when the timer T319' expires during the SDT procedure. The UE may stop the running SDT procedure when the timer T319' expires during the running SDT procedure.<br>c2. In some implementations, the UE may stay in the RRC inactive sate when the timer T319' expires during the SDT procedure. The UE may stop the running SDT procedure when the timer T319' expires during the running SDT procedure.<br>c3. In some implementations, the UE may stop and/or release the CG-TAT if the timer T319' expires during one SDT procedure. In some implementations, the UE may not stop the CG-TAT when the timer T319' expires.<br>c4. In some implementations, the UE may trigger an RRC Resume procedure or RRC establishment /RRC re-establishment procedure with the serving RAN (e.g., serving (anchor/non-anchor) cell) after the timer T319' expires.<br>c5. In some implementations, the UE may determine an SDT failure event happens when the timer T319' expires. In addition, the UE may release the stored SDT configuration after SDT failure event happens. For example, if an SDT failure event happens to a running SDT-CG procedure, the UE may release the SDT-CG configuration applied for the SDT-CG procedure. However, other SDT configuration (e.g., other SDT-CG configurations and/or other SDT-RA configurations) may not be impacted by the SDT failure event, so that the UE may still performs the SDT procedure based on the stored SDT-CG configuration. In other words, in some implementations, the SDT failure event may be associated with the (radio) resource applied for the SDT procedure (e.g., SDT-CG configuration/SDT-RA configuration). In some implementations, the UE may report SDT failure event to the serving cell with additional assistance information (e.g., the index of SDT-CG configuration/SDT-RA configuration). In some implementations, the UE may transmit the SDT failure report to the serving cell via an early measurement report procedure (or an idle/inactive measurement report procedure), via an RRC procedure, or via another SDT procedure.<br>c6. In some implementations, the UE may start a prohibit timer when the timer T319' expires. The UE may not be allowed to re-start the SDT procedure based on the stored SDT configuration during the running prohibit timer. The UE may re-start the SDT procedure (only) after the prohibit timer expires. |

TABLE 4-continued

| No. | Mechanisms |
|---|---|
| | In some implementations, the UE may release SDT configuration (e.g., SDT-CG configuration and/or SDT-RA configuration) when the timer T319' expires.<br>In some implementations, the UE may trigger/initiate at least one of an RRC resume procedure, an RRC (re)establishment procedure, and an RA procedure when/after the timer T319' expires. |
| 4 | BWP switching<br>In some implementations, the UE may move from the UE-specific DL-BWP/UL-BWP that are configured for the SDT procedure to the initial DL-BWP/UL-BWP of the anchor cell (or serving cell) when the UE move to (LTE/NR) RRC idle state (e.g., due to SDT failure event or (inter-RAT/intra-RAT) cell (re)selection procedure).<br>In some implementations, the UE may move from the UE-specific DL-BWP/UL-BWP that are configured for the SDT procedure to the initial DL-BWP/UL-BWP of the anchor cell (or serving cell) when the counting T319' expires in the UE. |

SDT Procedure During RRC Inactive State

NR supports the RRC_INACTIVE state and UEs with infrequent (e.g., periodic and/or non-periodic) data transmission are generally maintained by the network in the RRC_INACTIVE state. Until Rel-16, the UE is not allowed to perform data transmission in the RRC_INACTIVE state. Hence, the UE has to resume the connection (e.g., move to an RRC_CONNECTED state) for any DL reception and/or any UL data transmission. A connection setup and a subsequently release to the INACTIVE state happens for each data transmission regardless of how small and infrequent the data packets are. This results in an unnecessary power consumption and signal overhead.

Signalling overhead from the RRC Inactive state UEs due to transmission of small data is a general problem and becomes a critical issue as the number of UE increases in NR not only for the network performance and efficiency but also for the UE battery performance. In general, any device that has intermittent small data packets in the RRC Inactive state will benefit from enabling the SDT procedure in the RRC Inactive state.

RRC_INACTIVE State

Figure 2:
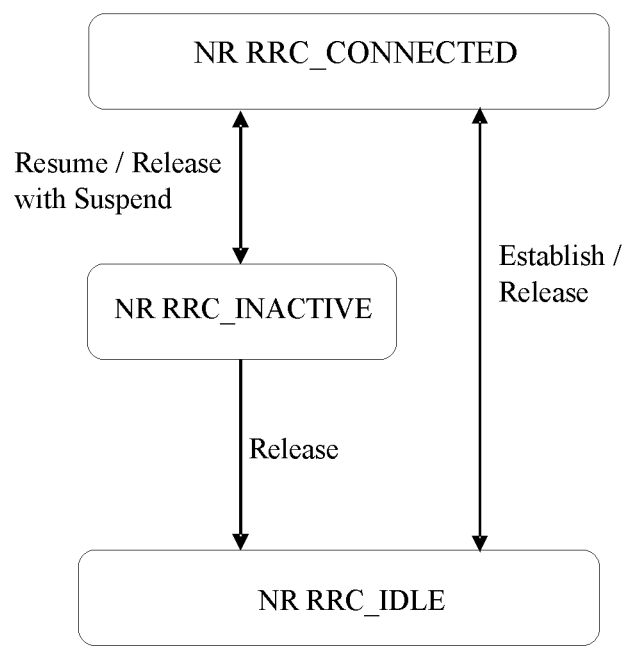
FIG. 2 is a diagram illustrating an overview of RRC state transitions, according to an example implementation of the present disclosure.

FIG. 2 is a diagram illustrating an overview of UE RRC state transitions, according to an example implementation of the present disclosure. The RRC state includes NR RRC_CONNECTED, NR RRC_INACTIVE and NR RRC_IDLE states. As illustrated in FIG. 2, the UE has only one RRC state in NR at a time.

The RRC_INACTIVE state is a state where a UE remains in a CM-CONNECTED state and may move within an area configured by the NG-RAN (e.g., the RNA) without notifying the NG-RAN. In the RRC_INACTIVE state, the last serving gNB node keeps the UE context and the UE-associated NG connection with the serving Access and Mobility management Function (AMF) and User Plane Function (UPF).

The RRC_INACTIVE state may support at least the following functions: a public land mobile network (PLMN) selection, a broadcast of system information, a cell reselection mobility, a paging initiated by the NG-RAN (e.g., RAN paging), a RAN-based notification area (RNA) managed by the NG-RAN, a DRX for RAN paging configured by the NG-RAN, a 5GC-NG-RAN connection (e.g., both C/U-planes) established for the UE, the UE (e.g., in an Inactive state) AS context stored in the NG-RAN, and the UE, the NG-RAN knows the RNA to which the UE belongs.

For an NR connected to the 5GC, the UE identity "I-RNTI" may be used to identify the UE context in an RRC_INACTIVE state. The I-RNTI provides the new NG-RAN node a reference to the UE context in the old NG-RAN node. How the new NG-RAN node is able to resolve the old NG-RAN ID from the I-RNTI is a matter of proper configuration in the old and new NG-RAN nodes. Some typical partitioning of a 40 bit I-RNTI assumes the following contents:

UE specific reference: reference to the UE context within a logical NG-RAN node;

NG-RAN node address index: information to identify the NG-RAN node that has allocated the UE specific part;

PLMN-specific information: information supporting network sharing deployments, providing an index to the PLMN ID part of the Global NG-RAN node identifier;

Stand-alone Non-Public Network (SNPN) specific information: SNPN may be a small PLMN configured by the operator. Each SNPN may be identified by a unique SNPN identity (e.g., an identifier of an SNPN comprising of a PLMN ID and a network identifier (NID) combination). A configured grant configuration may be associated with an SNPN ID.

UE Inactive AS Context: UE Inactive AS Context is stored when the connection is suspended (when the UE is in RRC_INACTIVE state) and restored when the connection is resumed (e.g., when the UE is transited from RRC_INACTIVE to RRC_CONNECTED state).

The suspension of the RRC connection is initiated by the network. When the RRC connection is suspended, the UE stores the UE Inactive AS context and any configuration received from the network, and transitions to an RRC_INACTIVE state. If the UE is configured with SCG, the UE releases the SCG configuration upon initiating an RRC Connection Resume procedure. The RRC message to suspend the RRC connection is integrity protected and ciphered. The resumption of a suspended RRC connection is initiated by the upper layers (e.g., when the UE needs to transit from RRC_INACTIVE state to RRC_CONNECTED state) or by the RRC layer (e.g., to perform an RNA update or by RAN paging from NG-RAN). When the RRC connection is resumed, the network configures the UE according to the RRC connection resume procedure based on the stored UE Inactive AS context and any RRC configuration received from the network. The RRC connection resume procedure re-activates AS security and re-establishes the SRB(s) and DRB(s).

In response to a request to resume the RRC connection, the network may resume the suspended RRC connection and send the UE to an RRC_CONNECTED state, or reject the request to resume and send the UE to an RRC_INACTIVE (with a wait timer) state, or may directly re-suspend the RRC connection and send the UE to an RRC_INACTIVE state, or may directly release the RRC connection and send the UE to an RRC_IDLE state, or may instruct the UE to initiate a NAS level recovery (e.g., in a case that the network sends an RRC setup message).

In addition, in the RRC_INACTIVE state, a UE specific discontinuous reception (DRX) may be configured by the upper layers or by the RRC layer, a UE controlled mobility may be based on a network configuration, the UE may store the UE Inactive AS context, and a RAN-based notification area may be configured by the RRC layer. Furthermore, the UE may perform the following behavior in the RRC_INACTIVE state:

Monitors Short Messages transmitted with P-RNTI over DCI;
Monitors a Paging channel for CN paging using 5G-S-TMSI and RAN paging using full I-RNTI;
Performs neighboring cell measurements and cell (re-) selection;
Performs RAN-based notification area updates periodically and when moving outside the configured RAN-based notification area;
Acquires system information and can send SI request (if configured).

Uplink Configured Grant (UL-CG) Configuration

In the uplink, a gNB may dynamically allocate resources to the UEs via the C-RNTI on PDCCH(s). A UE always monitors the PDCCH(s) in order to find possible (dynamic) grants for uplink transmission when its downlink reception is enabled (e.g., the activity governed by a DRX when configured). When Carrier Aggregation (CA) is configured, the same C-RNTI applies to all serving cells.

In addition, with Configured Grants, the gNB may allocate uplink resources for the initial HARQ transmissions to the UEs. Two types of configured uplink grants are defined:

With Type 1, RRC directly provides the configured uplink grant (including the periodicity).
With Type 2, RRC defines the periodicity of the configured uplink grant while PDCCH addressed to CS-RNTI may either signal and activate the configured uplink grant, or deactivate it (e.g., a PDCCH addressed to CS-RNTI indicates that the uplink grant can be implicitly reused according to the periodicity defined by the RRC, until deactivated).

Type 1 and Type 2 are configured by RRC per Serving Cell and per BWP. Multiple configurations can be activated simultaneously only on different Serving Cells. For Type 2, activation and deactivation are independent among the Serving Cells. For the same Serving Cell, the MAC entity is configured with either Type 1 or Type 2.

RRC configures the following parameters when the configured grant Type 1 is configured:

cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength (e.g., Start and Length Indicator Value (SLIV) in the 3GPP TS 38.214);
nrofHARQ-Processes: the number of HARQ processes for configured grant.

Upon configuration of a configured grant Type 1 for a serving cell by upper layers, the MAC entity shall:

store the uplink grant provided by upper layers as a configured uplink grant for the indicated serving cell;
initialise or re-initialise the configured uplink grant to start in the symbol according to timeDomainOffset and S (derived from SLIV as specified in the 3GPP TS 38.214), and to reoccur with periodicity.

Random Access Procedure

Based on the 3GPP technical specifications, two types of random access procedures are supported:

4-step RA type (with MSG1), such as contention-free random access (CFRA) and/or 4-step contention-based random access (CBRA).
2-step RA type (with MSGA), such as, 2-step CFRA and/or 2-step CBRA.

Two types of random access procedure are supported: 4-step RA type with MSG1 and 2-step RA type with MSGA. Both types of RA procedure support CBRA and CFRA.

The UE selects the type of random access at initiation of the random access procedure based on the network configuration:

when CFRA resources are not configured, an RSRP threshold is used by the UE to select between 2-step RA type and 4-step RA type;
when CFRA resources for 4-step RA type are configured, UE performs random access with 4-step RA type;
when CFRA resources for 2-step RA type are configured, UE performs random access with 2-step RA type.

The network does not configure CFRA resources for 4-step and 2-step RA types at the same time for a BWP. CFRA with 2-step RA type is only supported for handover.

The MSGA of the 2-step RA type includes a preamble on PRACH and a payload on PUSCH. After MSGA transmission, the UE monitors for a response from the network within a configured window. For CFRA, upon receiving the network response, the UE ends the random access procedure. For CBRA, if contention resolution is successful upon receiving the network response, the UE ends the random access procedure; while if fallback indication is received in MSGB, the UE performs MSG3 transmission and monitors contention resolution. If contention resolution is not successful after MSG3 (re)transmission(s), the UE goes back to MSGA transmission.

If the random access procedure with 2-step RA type is not completed after a number of MSGA transmissions, the UE can be configured to switch to CBRA with 4-step RA type.

For random access in a cell configured with supplementary uplink (SUL), the network can explicitly signal which carrier to use (UL or SUL). Otherwise, the UE selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, all uplink transmissions of the random access procedure remain on the selected carrier.

When CA is configured to the UE, the UE may perform the random access procedure with 2-step RA type only on the PCell while contention resolution can be cross-scheduled by the PCell.

When CA is configured to the UE, for the random access procedure with 4-step RA type, the first three steps of CBRA procedure always occur on the PCell while contention resolution (step 4: MSG4) can be cross-scheduled by the PCell. The three steps of a CFRA procedure started on the PCell remain on the PCell. The CFRA procedure on SCell can only be initiated by the gNB to establish timing advance for a secondary TAG. The CFRA procedure is initiated by the gNB with a PDCCH order (step 0) that is sent on a scheduling cell of an activated SCell of the secondary TAG, preamble transmission (step 1: MSG1) takes place on the indicated SCell, and Random Access Response (step 2: MSG2) takes place on the PCell.

FIGS. 3A, 3B, 3C and 3D are diagrams illustrating Contention-Based/Contention-Free (CB/CF) random access (RA) that include 2-step RA procedure and 4-step RA procedure, according to example implementations of the present disclosure.

Figure 3A:
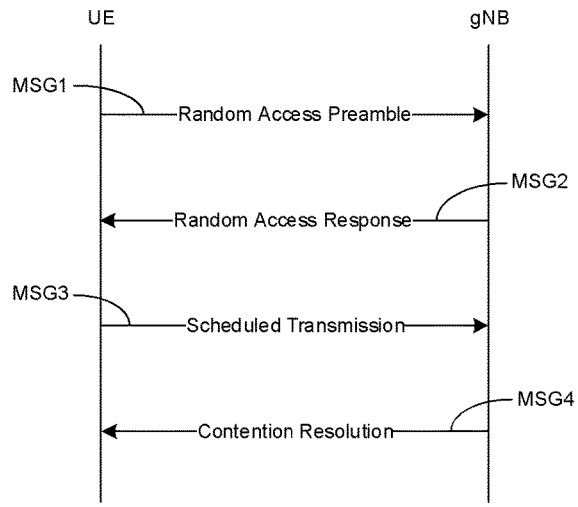
FIGS. 3A, 3B, 3C and 3D are diagrams illustrating Contention-Based/Contention-Free (CB/CF) random access (RA) that include 2-step RA procedure and 4-step RA procedure, according to example implementations of the present disclosure.

MSG1: an RA preamble transmission of the 4-step RA procedure, as illustrated in FIG. 3A.

MSG2: a Random Access Response (RAR) of the 4-step RA procedure. The RAR may be a response to the MSG1 in the 4-step RA procedure, as illustrated in FIG. 3A.

MSG3: a scheduled transmission of a message on an Uplink Shared Channel (UL-SCH) containing a Cell Radio Network Temporary Identifier (C-RNTI) Medium Access Control (MAC) Control Element (CE) or Common Control Channel (CCCH) Service Data Unit (SDU), submitted from an upper layer and associated with a UE contention resolution identity, as a part of the 4-step RA procedure illustrated in FIG. 3A.

MSG4: a Physical Downlink Control Channel (PDCCH) transmission for a contention resolution in the 4-step RA procedure. If the UE considers the contention resolution of the 4-step RA procedure is successful, the UE may determine that the 4-step RA procedure is successfully completed.

Figure 3B:
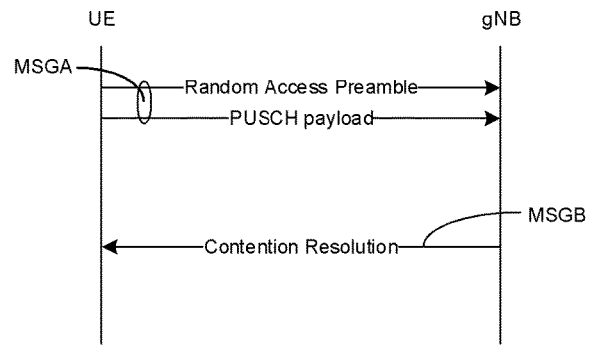

MSGA: preamble and/or payload transmissions of the 2-step RA procedure, as illustrated in FIG. 3B.

MSGB: a response to the MSGA in the 2-step RA procedure. The MSGB may include response(s) for a contention resolution, a fallback indication(s), and/or a backoff indication, as illustrated in FIG. 3B.

In FIGS. 3A and 3B, the 4-step CBRA and the 2-step CBRA are disclosed. The UE may select one preamble among a group of preambles. Then, the UE may transmit the selected RA preamble at least once in the beginning of the 4-step CBRA/2-step CBRA. After the UE transmits the selected RA preamble (e.g., the MSG1/MSGA), the UE may monitor DL channels (e.g., PDCCH) for the RAR (e.g., the MSG2/MSGB) within a pre-defined time internal (e.g., a response window in a time domain). When the contention resolution is received via the MSG4 of the 4-step CBRA or the MSGB of the 2-step CBRA and the contention resolution is considered successful, the UE determines that the 4-step CBRA/2-step CBRA procedure successfully completed.

Figure 3C:
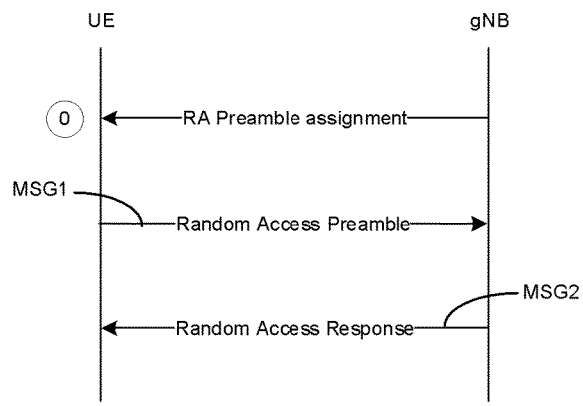
Figure 3D:
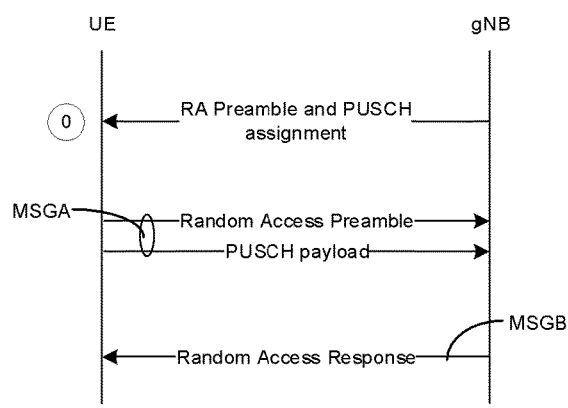

In FIGS. 3C and 3D, the 4-step CFRA and the 2-step CFRA are disclosed. For the 4-step CFRA, the MSG1 of the 4-step CFRA includes the assigned preamble that is pre-configured by the gNB (e.g., step 0 of FIG. 3C). The UE transmits the MSG1 to the gNB, and then monitors the RAR from the gNB within a pre-defined time internal (e.g., a response window in a time domain). For the 2-step CFRA, the MSGA of the 2-step CFRA includes the assigned preamble on Physical Random Access Channel (PRACH) and a payload on Physical Uplink Shared Channel (PUSCH), where the assigned preamble is pre-configured by the gNB (e.g., step 0 of FIG. 3D). After the UE transmits the MSGA to the gNB, the UE monitors DL channels (e.g., PDCCH) for the RAR from the gNB within a pre-defined time internal (e.g., a response window in a time domain). When the UE receives the RAR (e.g., the MSG2 of FIG. 3C or MSGB of FIG. 3D), the UE determines that the 4-step CFRA/2-step CFRA procedure successfully completed.

Figure 4:
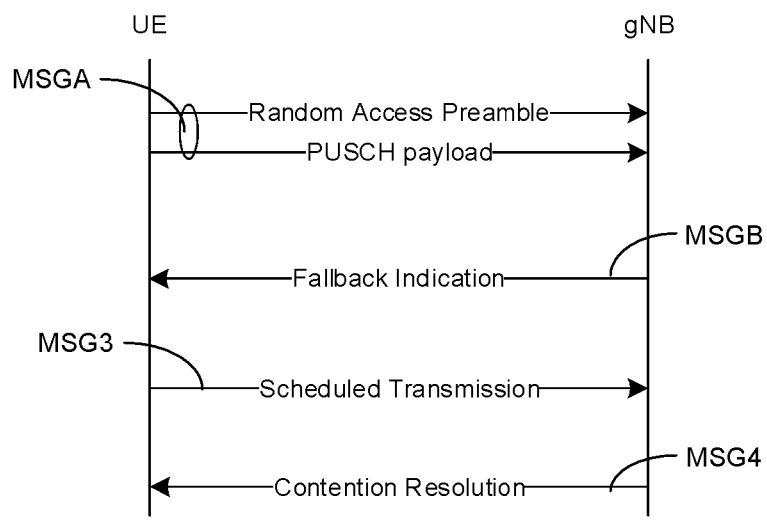
FIG. 4 is a diagram illustrating an RA procedure with fallback indication, according to an example implementation of the present disclosure.

FIG. 4 is a diagram illustrating an RA procedure with fallback indication, according to an example implementation of the present disclosure. As illustrated in FIG. 4, after the UE receives the MSGB with the fallback indication, the UE transmits the MSG3 to the gNB, and then monitors the contention resolution via the MSG4. If the contention resolution in the MSG4 is not successful or the MSG4 is not received (e.g., after the MSG3 transmission), the UE may perform the MSGA transmission of the 2-step RA procedure. However, if the 2-step RA procedure is not completed after a number of the MSGA transmissions, the UE may set/switch the RA type to the 4-step RA type and perform the 4-step RA procedure.

Figure 5A:
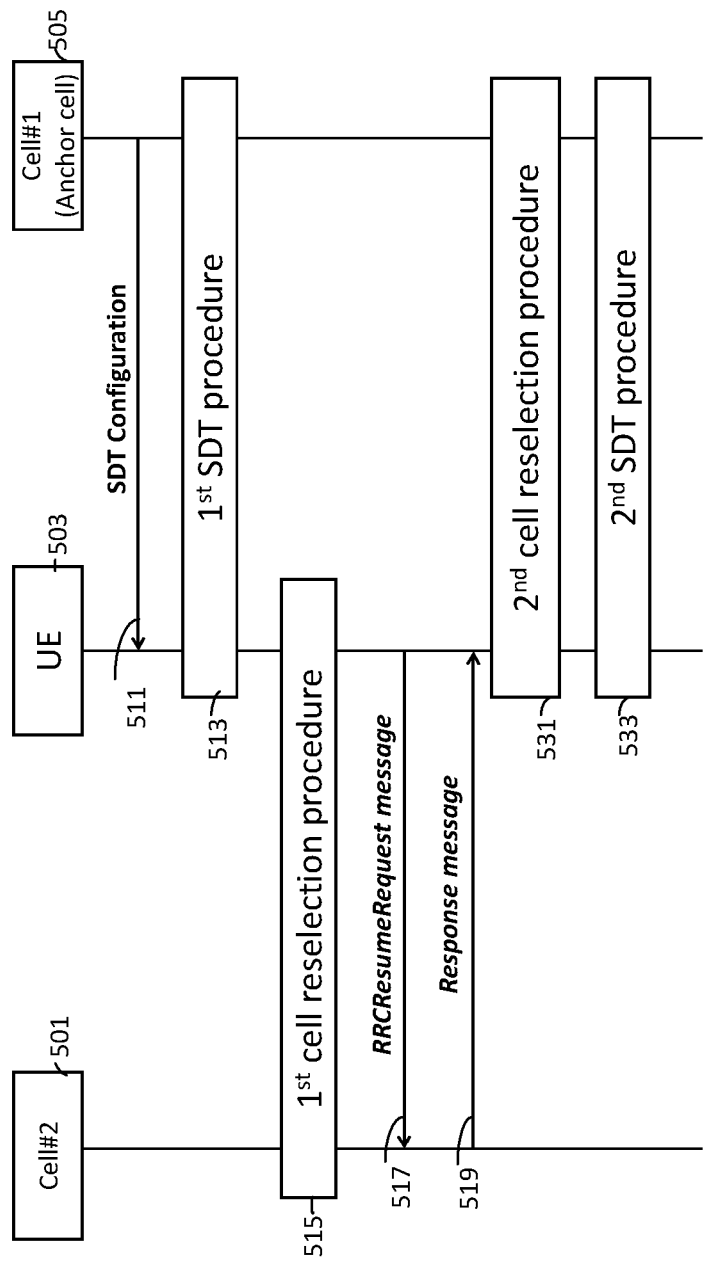
FIGS. 5A and 5B are diagrams illustrating SDT-CG configuration validity control, according to example implementations of the present disclosure.

FIG. 5A is a diagram illustrating the SDT-CG configuration validity control, according to an example implementation of the present disclosure. As illustrated in FIG. 5A, the UE 503 may firstly receive the SDT configuration from the serving cell #1 505 (e.g., step 511) (e.g., the SDT configuration may be transmitted to the UE 503 within an RRCRelease message with the 'suspendconfig' IE, which instructs the UE 503 to move to the RRC inactive sate). In this scenario, the serving cell #1 505 is the anchor cell of the UE 503. In some implementations, the UE 503 may receive one or more SDT-CG configuration(s) with/without an SDT-RA configuration. The SDT-CG configuration includes a plurality of (Type 1) UL-CG configurations for the UE 503 to transmit UL packets in the RRC_INACTIVE state. Based on the received SDT configuration, the UE 503 may initiate the $1^{st}$ SDT procedure 513 (e.g., via the at least a first UL-CG configuration within the stored SDT configuration). Please also note, the UE may implement action 104 and action 106, which are disclosed in FIG. 1, with the $1^{st}$ SDT procedure 513.

In some implementations, the UE may stop applying the first UL-CG configuration for the $1^{st}$ SDT procedure 513 when a DL-RSRP measurement result associated with the first UL-CG configuration is lower than the first DL-RSRP threshold. In some implementations, the UE may re-select the first UL-CG configuration for a UL packet transmission of the $1^{st}$ SDT procedure 513 when the DL-RSRP measurement result associated with the first UL-CG configuration is larger than the first DL-RSRP threshold again. Please note, in some implementations, the UE may determine the DL-RSRP measurement result associated with the first UL-CG configuration according to at least one downlink (DL) Synchronization Signal Blocks (SSBs) associated with the first UL-CG configuration, where the associations between the SSBs and the plurality of UL-CG configurations are configured in the SDT configuration that is received by the UE at step 511. In some implementations, the UE 503 may consider the SDT-CG procedure fails when a plurality of DL-RSRP measurement results associated with the plurality of UL-CG configurations are lower than a second DL-RSRP threshold (e.g., none of the DL-RSRP measurement results associated with the SDT-CG configurations exceeds the second DL-RSRP threshold). In this condition, the UE 503 may consider the running SDT-CG procedure fails. Then, the UE 503 may perform a random access (RA) procedure for a UL packet transmission of the SDT procedure with the serving cell #1 505 when the plurality of DL-RSRP measurement results associated with the plurality of UL-CG configurations are lower than the second DL-RSRP threshold. In some implementations, the RA procedure may be an RRC procedure (e.g., RRC Resume procedure) or an SDT-RA procedure and the RA procedure may be implemented via a 2-step/4-step RA procedure. Please also note, in some implementations, the first DL-RSRP threshold and the second DL-RSRP threshold may be configured with different values. In some implementations, the first DL-RSRP threshold and the second DL-RSRP threshold may be configured with the same value.

In some implementations, the serving cell #1 505 may terminate the $1^{st}$ SDT procedure 513 by transmitting an RRCRelease message to the UE 503, so that the UE 503 may consider the $1^{st}$ SDT procedure513 is terminated successfully after receiving the RRCRelease message. After the $1^{st}$ SDT procedure 513 is terminated successfully, the UE 503 may reselect to the cell #2 501 after the $1^{st}$ cell reselection procedure 515 is implemented successfully (e.g., based on the idle mode UE procedure defined in the 3GPP TS 38.304/TS 36.304 technical specifications). Please note, in some other conditions, the $1^{st}$ SDT procedure at step 513 may be interrupted because of the $1^{st}$ cell reselection procedure 515 is performed during the $1^{st}$ SDT procedure 513. In this condition, the UE 503 (and also the serving cell #1) 505 may consider the $1^{st}$ SDT procedure 513 is interrupted when the UE 503 moves to the cell #2 501 after the $1^{st}$ cell reselection procedure 515. Please note, in some implementations, the UE 503 may still keep the stored SDT-CG configuration (and the stored SDT-RA configuration if there is any) after the $1^{st}$ cell reselection procedure 515. In some implementations, after the $1^{st}$ cell reselection procedure 515, the UE 503 may initiate a signaling exchange with the cell #2 501 by transmitting (at least) one RRCResumeRequest message to the cell #2 501 (e.g., step 517). In some implementations, the RRCResumeRequest message is part of an RRC procedure (e.g., RRC Resume procedure) with the cell #2 501. In some other implementations, the RRCResumeRequest message is part of an SDT-CG procedure associated with the cell #2 501. In some implementations, the UE 503 may release the stored SDT-CG configuration, which is received by the UE 503 at step 511 (associated with the cell #1 505), upon/after the UE transmits the RRCResumeRequest message (e.g., step 517). In some implementations, the UE 503 may also release the stored SDT-RA configuration, which is received by the UE 503 at step 511 (associated with the cell #1 505), upon/after the UE transmits the RRCResumeRequest message (e.g., step 517). In some other implementations, the UE 503 may still store the stored SDT-RA configuration, which is received by the UE 503 at step 511 (associated with the cell #1 505), upon/after the UE transmits the RRCResumeRequest message (e.g., step 517).

After step 517, the UE 503 may receive the Response message from the cell #2 501 (e.g., step 519). In some implementations, the Response message may be an RRC message (e.g., RRCResume/RRCSetup/RRC reestablishment/RRCRelease message). In some implementations, the Response message may be a (HARQ/ARQ/Layer-1) ACK/NACK message to reply the RRCResume message, which is received by the cell #2 501 at step 517. After step 519, the UE 503 may re-select to the cell #1 505 during the $2^{nd}$ cell reselection procedure 531 (e.g., also based on the idle mode UE procedure defined in the 3GPP TS 38.304/TS 36.304 technical specifications). In addition, the running RRC procedure (e.g., step 517/519) may or may not be interrupted by the $2^{nd}$ cell reselection procedure 531. After the UE 503 re-selects to the cell #1 505 as its serving cell during the $2^{nd}$ cell reselection procedure 531, the UE 503 may initiate the $2^{nd}$ SDT procedure 533 with the cell #1 505. In the $2^{nd}$ SDT procedure 533, the UE 503 may not initiate an SDT-CG procedure with the cell #1 505 because the stored SDT-CG configurations are released at step 517. Instead, the UE 503 may initiate an SDT-RA procedure with the cell #1 505 based on the stored SDT-RA configurations (received by the UE 503 at step 511) if the UE 503 still keep the SDT-RA configuration after step 517. Otherwise, the UE 503 may not initiate the $2^{nd}$ SDT procedure 533 with the serving cell #1 505 if the stored SDT-CG configurations/SDT-RA configuration are released after step 517.

Figure 5B:
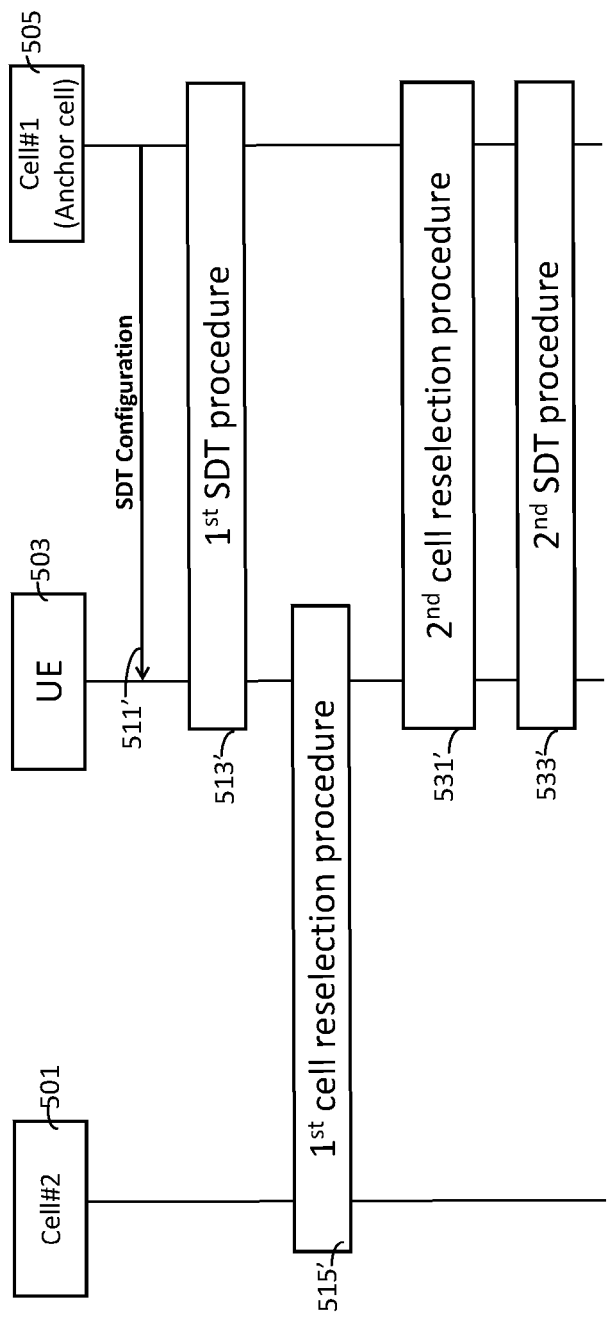

FIG. 5B is a diagram illustrating the SDT-CG configuration validity control, according to an example implementation of the present disclosure. As illustrated in FIG. 5B, the UE 503 may firstly receive the SDT configuration from the serving cell #1 505 (e.g., step 511') (e.g., the SDT configuration may be transmitted to the UE 503 within an RRCRelease message with the 'suspendconfig' IE, which instructs the UE 503 to move to the RRC inactive sate). In this scenario, the serving cell #1 505 is the anchor cell of the UE 503. In some implementations, the UE 503 may receive one or more SDT-CG configuration(s) with/without an SDT-RA configuration. The SDT-CG configuration includes a plurality of (Type 1) UL-CG configurations for the UE 503 to transmit UL packets in the RRC_INACTIVE state. Based on the received SDT configuration, the UE 503 may initiate the $1^{st}$ SDT procedure 513' (e.g., via the at least one of the UL-CG configurations within the stored SDT configuration). In some conditions, the serving cell #1 505 may terminate the $1^{st}$ SDT procedure 513' by transmitting an RRCRelease message to the UE 503 during the $1^{st}$ SDT procedure 513' and may also consider the $1^{st}$ SDT procedure 513' is terminated successfully after receiving the RRCRelease message during the $1^{st}$ SDT procedure 513'. After the $1^{st}$ SDT procedure 513' is terminated successfully, the UE 503 may reselect to the cell #2 501 after the $1^{st}$ cell reselection procedure 515' is implemented successfully (e.g., based on the idle mode UE procedure defined in the 3GPP TS 38.304/TS 36.304 technical specifications). Please note, in some other conditions, the $1^{st}$ SDT procedure 513' may be interrupted because of the $1^{st}$ cell reselection procedure 515' is performed during the $1^{st}$ SDT procedure 513'. In this condition, the UE 503 (and also the serving cell #1 505) may consider the $1^{st}$ SDT procedure 513'*is* interrupted when the UE 503 moves to the cell #2 501 after the $1^{st}$ cell reselection procedure 515'. Please note, in some implementations, the UE 503 may still keep the stored SDT-CG configuration (and the stored SDT-RA configuration if there is any) after the $1^{st}$ cell reselection procedure 515'. In some implementations, the UE 503 may release the stored SDT-RA configuration, which is received by the UE 503 at step 511' (associated with the cell #1 505), upon/after 1*s* t cell reselection procedure 515'. Then, after 1*s* t cell reselection procedure 515', the UE 503 may re-select to the cell #1 505 during the $2^{nd}$ cell reselection procedure 531' (e.g., also based on the idle mode UE procedure defined in the 3GPP TS 38.304/TS 36.304 technical specifications). Please also note, in FIG. 5B, the UE has not transmitted RRCResumeRequest message to the serving cell #2 501 (e.g., via an RRC procedure or an SDT procedure) and the UE may still keep the SDT-CG configurations and/or SDT-RA configuration after the UE keeps camping on the cell #2 501. In some implementations, the UE may initiate an (on-demand) System Information (SI) Request procedure with the serving cell #2 501 (e.g., via a 2-step RA procedure or a 4-step RA procedure) and the on-demand SI Request procedure may not influence the UE keeps the stored the SDT-CG configurations/SDT-RA configurations.

After the UE 503 re-selects to the cell #1 505 as its serving cell during the $2^{nd}$ cell reselection procedure 531', the UE 503 may initiate the $2^{nd}$ SDT procedure 533' with the cell #1 505. In the $2^{nd}$ SDT procedure 533', the UE 503 may initiate an SDT-CG procedure with the cell #1 505 based on the stored SDT-CG configurations (received by the UE 503 at step 511') if the CG-TAT timer is re-started/re-activated before (or when/upon) the $2^{nd}$ cell reselection procedure 531' is initiated. In contrast, the UE may still not be able to initiate an SDT-CG procedure with the cell #1 505 based on the stored SDT-CG configurations (received by the UE 503 at step 511') if the CG-TAT timer is not re-started/re-activated yet before/when/upon the $2^{nd}$ cell reselection procedure 531' is initiated (even the UE still keep those stored SDT-CG configurations). In some additional implementations, the UE 503 may initiate an SDT-RA procedure with cell #1 based on the stored SDT-RA configurations (received by the UE 503 at step 511') if the UE 503 still keep the SDT-RA configuration after the $1^{st}$ cell reselection procedure 515'. Otherwise, the UE 503 may not initiate the $2^{nd}$ SDT procedure 533' with the serving cell #1 505 if the stored SDT-CG configurations/SDT-RA configuration are released after the $1^{st}$ cell reselection procedure 515'.

Figure 6:
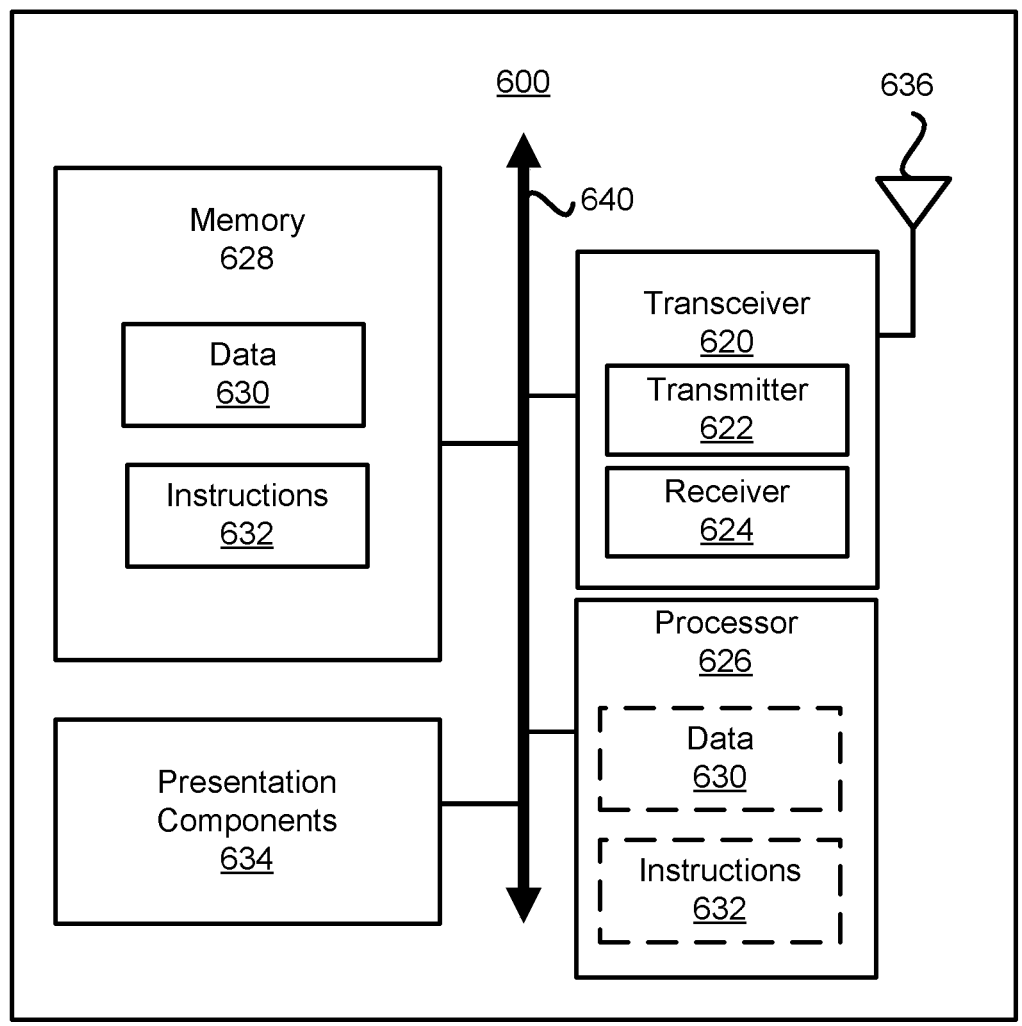
FIG. 6 is a block diagram illustrating a node for wireless communication, according to an example implementation of the present disclosure.

FIG. 6 is a block diagram illustrating a node for wireless communication, according to an example implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, a system communications management module, input/output (I/O) ports, I/O components, and a power supply (not illustrated in FIG. 6).

Each of these components may be in communication with each other, directly or indirectly, over one or more buses 640. The node 600 may be a UE or a BS that performs various disclosed functions illustrated in FIG. 1 and examples in this disclosure.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable, and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media, and removable (and non-removable) media. Computer-readable media may include computer storage media and communication media. Computer storage media may include both volatile (and/or non-volatile), as well as removable (and/or non-removable), media implemented according to any method or technology for storage of information, such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave, or other transport mechanisms and include any information delivery media. The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device, a central processing unit (CPU), a microcontroller, an ASIC, etc. The processor 626 may include memory. The processor 626 may process the data 630 and the instructions 632 received from the memory 628, and information received through the transceiver 620, the baseband communications module, and/or the network communications module. The processor 626 may also process information to be sent to the transceiver 620 for transmission via the antenna 636, and/or to the network communications module for transmission to a CN.

One or more presentation components 634 may present data to a person or other devices. Presentation components 634 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for a user equipment (UE) for performing a small data transmission (SDT) procedure, the method comprising:
   receiving, from a base station (BS), an SDT configuration including a plurality of uplink configured grant (UL-CG) configurations for the SDT procedure, each of the plurality of UL-CG configurations being associated with a downlink reference signal received power (DL-RSRP) threshold;
   applying one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and
   initiating, during the SDT procedure, a random access (RA) procedure in a case that none of a plurality of DL-RSRP measurement results of a plurality of SSBs associated with the plurality of UL-CG configurations is higher than any of the plurality of DL-RSRP thresholds, wherein the SDT procedure includes a configured grant (CG) SDT procedure.

2. The method of claim 1, further comprising:
determining that the RA procedure is successfully completed after receiving a random access response (RAR) comprising a UL grant on a physical downlink control channel (PDCCH).

3. The method of claim 1, wherein a configured grant-time alignment timer (CG-TAT) is running during the SDT procedure.

4. The method of claim 1, wherein the RA procedure includes a 2-step RA procedure.

5. The method of claim 1, wherein the RA procedure includes a 4-step RA procedure.

6. The method of claim 1, wherein the RA procedure includes a contention-based random access (CBRA) procedure.

7. The method of claim 1, wherein the RA procedure includes a contention-free random access (CFRA) procedure.

8. The method of claim 1, wherein the RA procedure is not an RA-SDT procedure.

9. A user equipment (UE) for performing a small data transmission (SDT) procedure, the UE comprising:
one or more processors; and
at least one memory coupled to the one or more processors, wherein the at least one memory stores one or more computer-executable-instructions that, when executed by the one or more processors, cause the UE to:
receive, from a base station (BS), an SDT configuration including a plurality of uplink configured grant (UL-CG) configurations for the SDT procedure, each of the plurality of UL-CG configurations being associated with a downlink reference signal received power (DL-RSRP) threshold;
apply one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and
initiate, during the SDT procedure, a random access (RA) procedure in a case that none of a plurality of DL-RSRP measurement results of a plurality of SSBs associated with the plurality of UL-CG configurations is higher than any of the plurality of DL-RSRP thresholds,
wherein the SDT procedure includes a configured grant (CG) SDT procedure.

10. The UE of claim 9, wherein the one or more computer-executable instructions, when executed by the one or more processors, further cause the UE to:
determine that the RA procedure is successfully completed after receiving a random access response (RAR) comprising a UL grant on a physical downlink control channel (PDCCH).

11. The UE of claim 9, wherein a configured grant-time alignment timer (CG-TAT) is running during the SDT procedure.

12. The UE of claim 9, wherein the RA procedure includes a 2-step RA procedure.

13. The UE of claim 9, wherein the RA procedure includes a 4-step RA procedure.

14. The UE of claim 9, wherein the RA procedure includes a contention-based random access (CBRA) procedure.

15. The UE of claim 9, wherein the RA procedure includes a contention-free random access (CFRA) procedure.

16. The UE of claim 9, wherein the RA procedure is not an RA-SDT procedure.

17. A base station (BS) for performing a small data transmission (SDT) procedure, the BS comprising:
one or more processors; and
at least one memory coupled to the one or more processors, wherein the at least one memory stores one or more computer-executable-instructions that, when executed by the one or more processors, cause the BS to:
transmit, to a user equipment (UE), an SDT configuration including a plurality of uplink configured grant (UL-CG) configurations for the SDT procedure, each of the plurality of UL-CG configurations being associated with a downlink reference signal received power (DL-RSRP) threshold;
receive, from the UE, one or more UL transmissions on one of the plurality of UL-CG configurations for the SDT procedure in a case that a DL-RSRP measurement result of a synchronization signal block (SSB) associated with the one of the plurality of UL-CG configurations is higher than one of a plurality of DL-RSRP thresholds; and
transmit, to the UE during the SDT procedure, a random access response in response to a random access (RA) procedure in a case that none of a plurality of DL-RSRP measurement results of a plurality of SSBs associated with the plurality of UL-CG configurations is higher than any of the plurality of DL-RSRP thresholds,
wherein the SDT procedure includes a configured grant (CG) SDT procedure.

* * * * *